(12) United States Patent
Hori

(10) Patent No.: US 8,476,566 B2
(45) Date of Patent: Jul. 2, 2013

(54) LIBRARY DEVICE AND INCLINATION CORRECTION METHOD OF MOVABLE UNIT PROVIDED IN LIBRARY DEVICE

(75) Inventor: Daisuke Hori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 13/184,993

(22) Filed: Jul. 18, 2011

(65) Prior Publication Data

US 2011/0273794 A1 Nov. 10, 2011

Related U.S. Application Data

(63) Continuation of application No. PCT/JP2009/050766, filed on Jan. 20, 2009.

(51) Int. Cl.
*G01C 21/02* (2006.01)
*G01C 21/24* (2006.01)

(52) U.S. Cl.
USPC ...................................... 250/206.2; 700/218

(58) Field of Classification Search
USPC .............. 250/206.2, 559.3, 559.29; 700/218, 700/215, 245; 360/91; 901/46, 50
See application file for complete search history.

(56) References Cited

U.S. PATENT DOCUMENTS

| | | | |
|---|---|---|---|
| 5,203,073 A * | 4/1993 | Kotake et al. | .................... 29/784 |
| 6,331,714 B1 | 12/2001 | Gardner, Jr. et al. | |
| 6,858,854 B2 * | 2/2005 | Keum et al. | .............. 250/492.21 |
| 7,793,906 B2 * | 9/2010 | Natsume | .................... 248/316.1 |
| 8,214,076 B2 * | 7/2012 | Sasaki | ........................... 700/218 |
| 2007/0115362 A1 | 5/2007 | Sasaki | |
| 2007/0216912 A1 | 9/2007 | Mihara | |

FOREIGN PATENT DOCUMENTS

| | | |
|---|---|---|
| JP | 58-57662 | 4/1983 |
| JP | 3-2465 | 1/1991 |
| JP | 5-342723 | 12/1993 |
| JP | 9-169408 | 6/1997 |
| JP | 2000-314611 | 11/2000 |
| JP | 2001-174414 | 6/2001 |
| JP | 2007-139617 | 6/2007 |
| JP | 2007-250114 | 9/2007 |
| JP | 2008-243356 | 10/2008 |

OTHER PUBLICATIONS

International Search Report for PCT/JP2009/050766, mailed Mar. 3, 2009.

* cited by examiner

*Primary Examiner* — Seung C Sohn
(74) *Attorney, Agent, or Firm* — Staas & Halsey LLP

(57) ABSTRACT

A library device includes: a storage shelf including storage units aligned in a plurality of columns; and a conveying robot that grasps and conveys cartridges stored in the storage units, wherein the conveying robot includes: a base board located to face the plurality of columns, one end of the base board being supported movably up and down by a first support post, and another end of the base board being supported movably up and down by a second support post; a movable unit including a grasping unit grasping the cartridges stored in the storage units and moving on the base board; an inclination measuring unit measuring an inclination of the movable unit; and an inclination correction unit adjusting heights of both ends of the base board according to an inclination value of the movable unit measured by the inclination measuring unit and correcting the inclination of the movable unit.

2 Claims, 27 Drawing Sheets

LIBRARY DEVICE AND INCLINATION CORRECTION METHOD OF MOVABLE UNIT PROVIDED IN LIBRARY DEVICE

CROSS-REFERENCE TO RELATED APPLICATION

This application is a continuation application of PCT/JP2009/050766 filed Jan. 20, 2009, the contents of which are herein wholly incorporated by reference.

FIELD

A certain aspect of the embodiments discussed herein is related to a library device and an inclination correction method of a movable unit provided in a library device.

BACKGROUND

A grasping unit provided with a hand unit is used when conveying magnetic tape cartridges and optical cartridges (hereinafter, referred to as cartridges) in a magnetic tape library device. The grasping unit moves up, down, right and left, and transfers cartridges between an intended storage unit and a cartridge drive device.

The grasping unit determines a storage unit storing a cartridge to be conveyed, moves to the front of the storage unit, makes the hand unit grasp the cartridge, and carries out the transfer of the cartridge.

At this time, it is desired that the hand unit is positioned properly to the target cartridge. Conventionally, various approaches of positioning such a hand unit have been proposed. For example, a correction method of a position data and an object position determination system have been known as related arts to determine or correct the position of the conveying robot (see. Japanese Laid-Open Patent Publication Nos. 5-342723 and 2000-314611).

SUMMARY

According to an aspect of the present invention, there is provided a library device including: a storage shelf that includes storage units aligned in a plurality of columns; and a conveying robot that grasps and conveys cartridges stored in the storage units, wherein the conveying robot includes: a base board that is located to face the plurality of columns, one end of the base board being supported movably up and down by a first support post, and another end of the base board being supported movably up and down by a second support post; a movable unit that includes a grasping unit that grasps the cartridges stored in the storage units and moves on the base board; an inclination measuring unit that measures an inclination of the movable unit; and an inclination correction unit that adjusts heights of both ends of the base board according to an inclination value of the movable unit measured by the inclination measuring unit and corrects the inclination of the movable unit, each of the first support post and the second support post includes a part where a first engage portion is formed that is engaged with a second engage portion provided to the base board and supports the base board, and the inclination correction unit includes a first motor that drives the first support post and a second motor that drives the second support post.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, methods of determining or correcting the position of the conveying robot have been proposed. The grasping unit is located on a base board which is movable up and down, and moves horizontally on this base board. The grasping unit includes various devices, and has a certain weight. When such grasping unit moves on the base board, the base board bends. If the base board bends, the grasping unit on the base board inclines. The degree of inclination depends on the position of the grasping unit on the base board. If the grasping unit inclines, it becomes difficult for the hand unit to grasp a cartridge to be grasped.

In order to prevent such a situation, it is considered to make the thickness of the base board thicker, or to use a material of which a flexural rigidity and the like is high.

However, recently, a downsizing and density growth of the product are enhanced, and it is difficult to make the thickness of the base board thicker. In addition, the use of the material with high flexural rigidity leads an increase of the product cost, and impedes the cost reduction.

In related arts disclosed in Japanese Laid-Open Patent Publication Nos. 5-342723 and 2000-314611, it is not considered to correct the inclination of the grasping unit.

A description will now be given of embodiments of the present invention with reference to accompanied drawings. In drawings, the size, the ratio and the like of each unit are not illustrated to correspond to actual portions completely. In addition, in several drawings, detail illustration may be omitted.

First Embodiment

Figure 1:
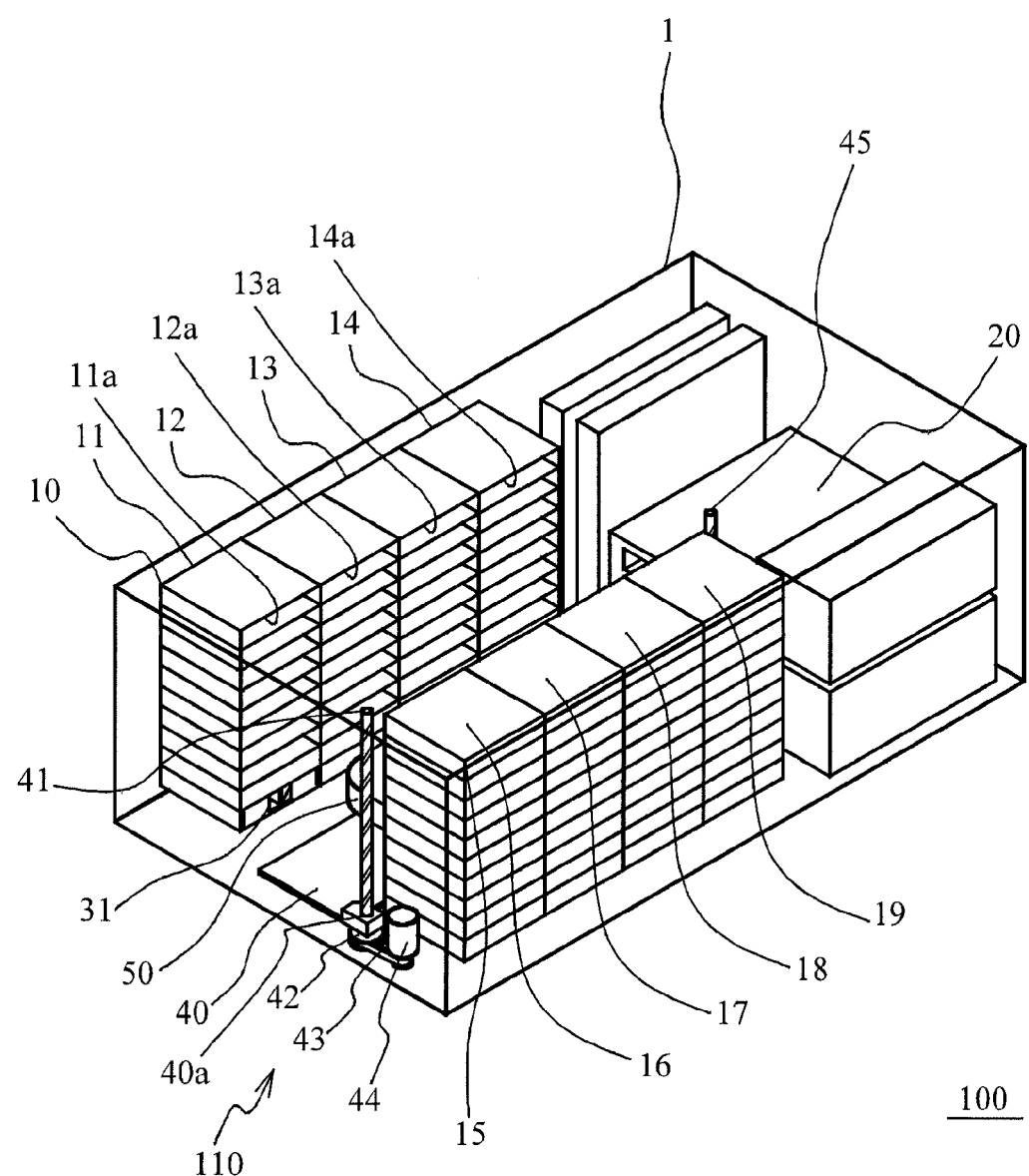
FIG. 1 is an explanatory diagram illustrating a schematic structure of a library device in accordance with a first embodiment.
Figure 2:
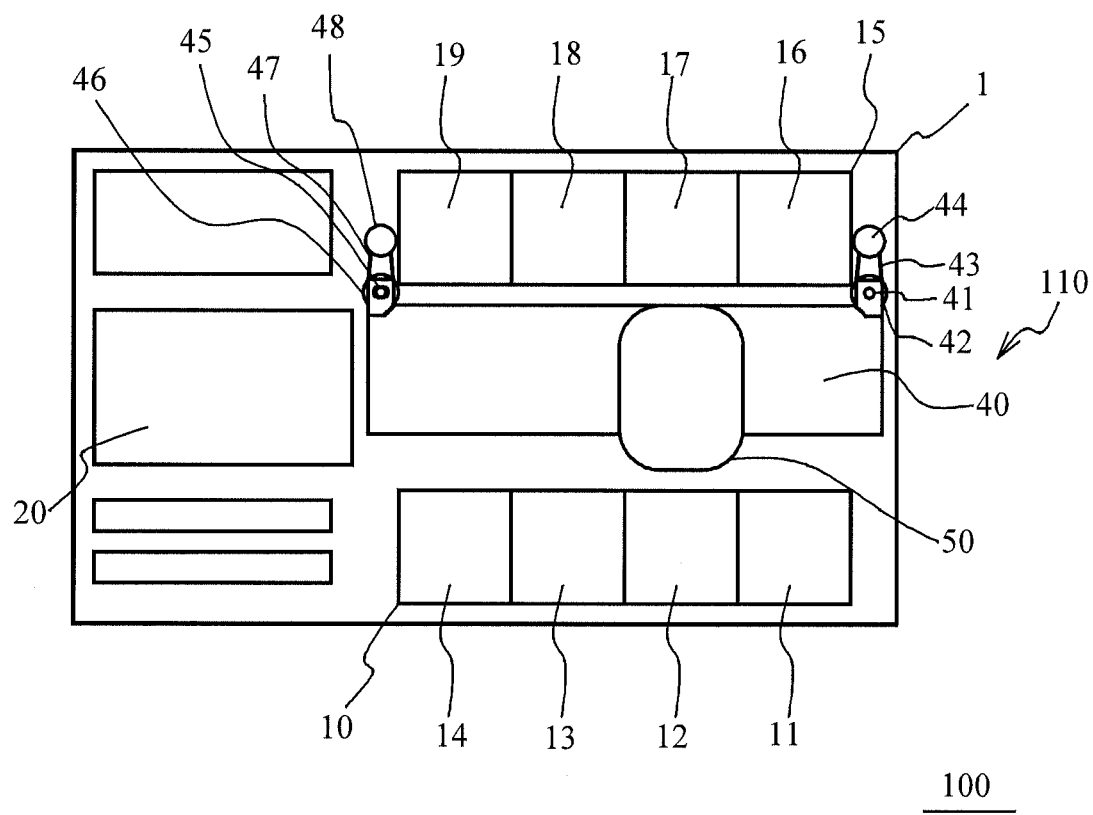
FIG. 2 is an explanatory diagram of the library device viewed from overhead.
Figure 3:
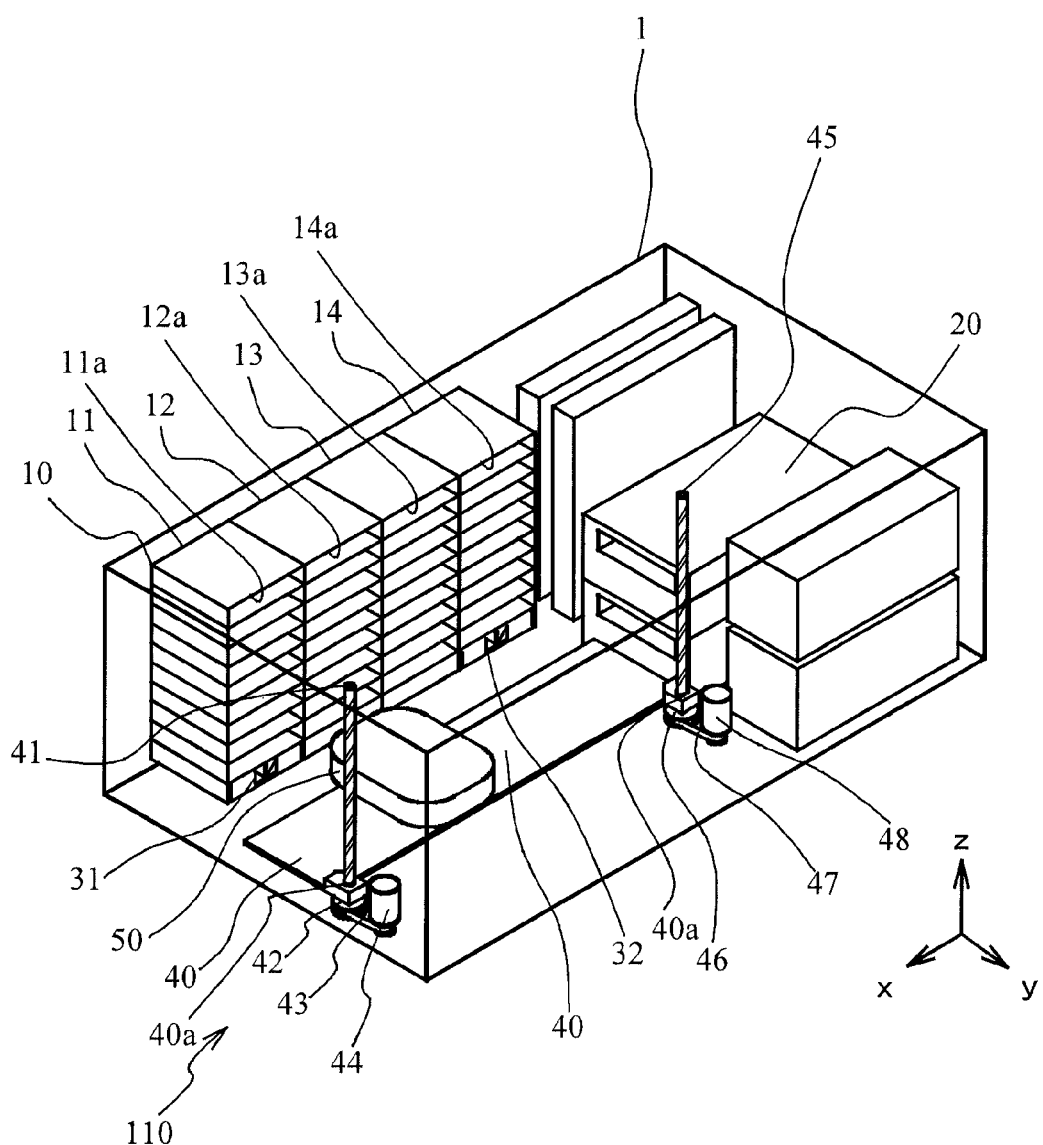
FIG. 3 is an explanatory diagram illustrating a state where a second storage shelf is removed from the library device.
Figure 4:
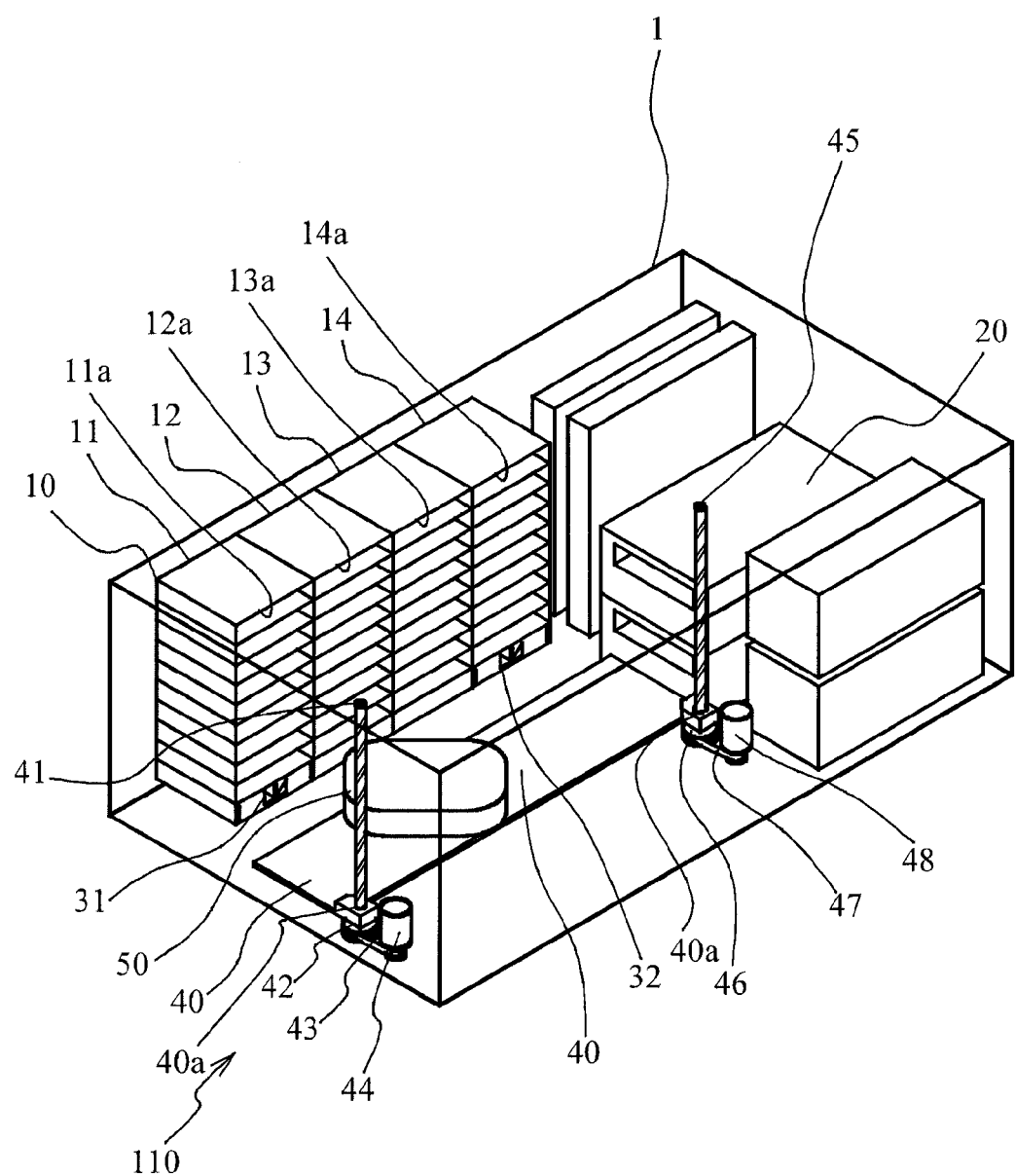
FIG. 4 is an explanatory diagram illustrating a state where a movable unit is moved to the front of the second column, and directed toward a first flag.
Figure 5:
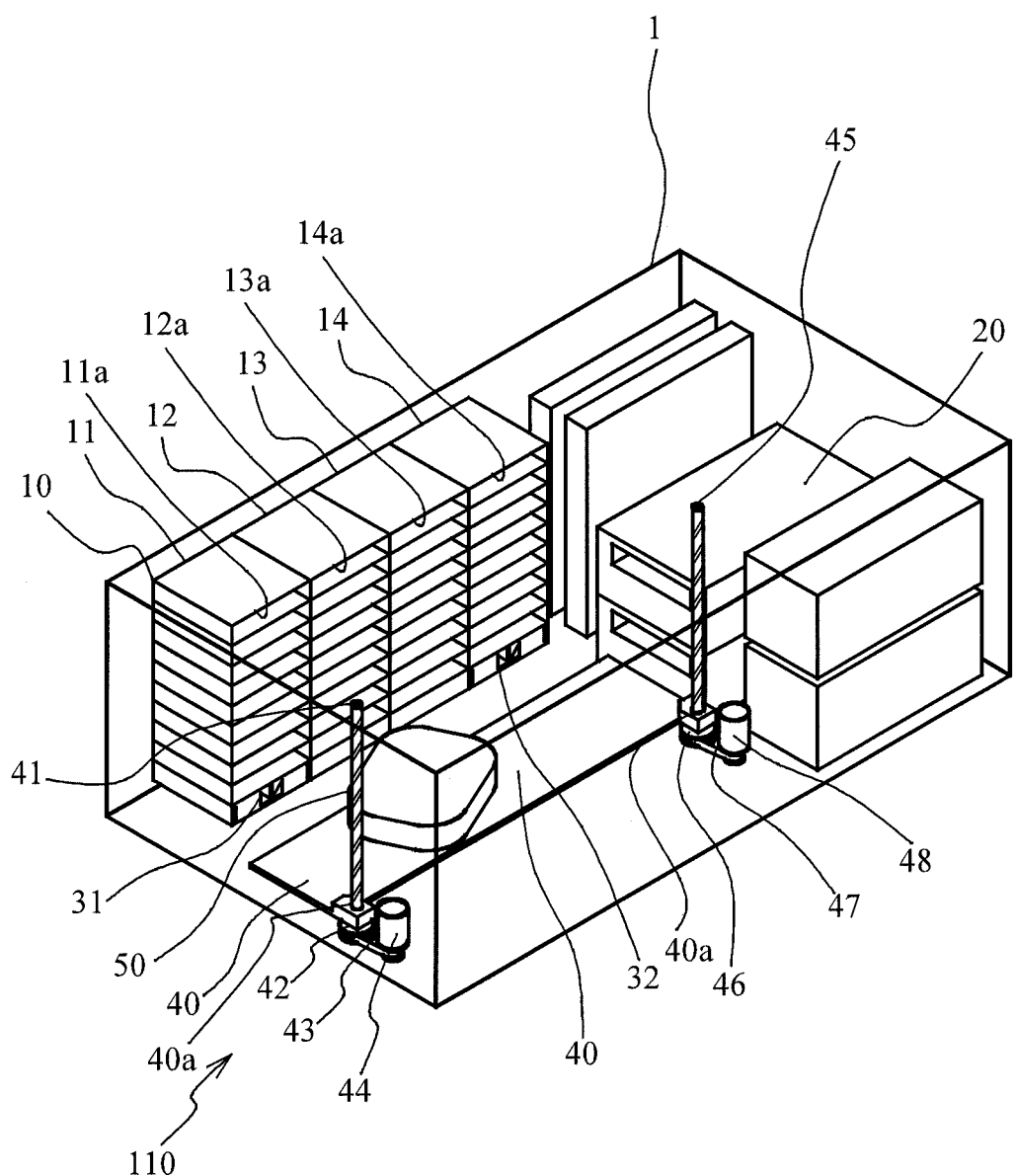
FIG. 5 is an explanatory diagram illustrating a state where the movable unit is moved to the front of the second column, and directed toward a second flag.

FIG. 1 is an explanatory diagram illustrating a schematic structure of a library device 100 in accordance with a first embodiment. FIG. 2 is an explanatory diagram of the library device 100 viewed from overhead. FIG. 3 is an explanatory diagram illustrating a state where a second storage shelf 15 is removed from the library device 100. FIG. 4 is an explanatory diagram illustrating a state where a movable unit 50 is moved to the front of a second column 12, and directed toward a first flag 31. FIG. 5 is an explanatory diagram illustrating a state where the movable unit is moved to the front of the second column 12, and directed toward a second flag 32.

The library device 100 includes a chassis 1. A three-dimensional coordinate system, namely an xyz-coordinate system, is defined in the inner space of the chassis 1 as illustrated in FIG. 3. The x-direction of the xyz-coordinate system corresponds to an alignment direction of columns included in a first storage shelf 10 and the second storage shelf 15. That is to say, the x-direction extends in the horizontal direction in parallel with the first storage shelf 10 and the second storage shelf 15. The y-direction is perpendicular to the x-direction, and extends in the horizontal direction. The z-direction is a vertical direction.

The library device 100 is provided with a cartridge drive device 20 where data in a cartridge 2 is loaded. The library device 100 includes storage shelves 10 and 15 having storage units 11a and so on which are aligned in multiple columns. More specifically, the first storage shelf 10 and the second storage shelf 15 are provided in the chassis 1. The first storage shelf 10 includes a first column 11 formed by stacking storage units 11a vertically, and the second column 12 formed by stacking storage units 12a vertically. In addition, the first storage shelf 10 includes a third column 13 formed by stacking storage units 13a vertically, and a fourth column 14 formed by stacking storage units 14a vertically. The first column 11 through the fourth column 14 are aligned along the x-direction. The second storage shelf 15 is located to face the first storage shelf 10. The second storage shelf 15 includes a fifth column 16, a sixth column 17, a seventh column 18, and an eighth column 19 formed in the same manner as the first storage shelf. The fifth column 16 through the eighth column 19 are aligned along the x-direction.

The first flag 31 and the second flag 32 are provided to storage units 11a and 14a included in the first column 11 and the fourth column 14 which are located on the both sides of the first storage shelf 10 respectively. More specifically, the first flag 31 is provided to the storage unit 11a located at a bottom row of the first column 11, and the second flag 32 is provided to the storage unit 14a located at a bottom row of the fourth column 14.

The library device 100 is further provided with a conveying robot 110 that grasps and conveys cartridges 2 stored in storage units 11a and so on.

The conveying robot 110 includes a base board 40, the movable unit 50, a first support post 41, and a second support post 45. More specifically, the conveying robot 110 includes the base board 40 which is located to face multiple columns included in the first storage shelf 10 and the second storage shelf 15, one end of the base board 40 is supported movably up and down by the first support post 41, and the other end of the base board 40 is supported movably up and down by the second support post 45.

The conveying robot 110 is further provided with the movable unit 50 which reciprocates on the base board 40. In addition, the conveying robot 110 includes an inclination correction unit that adjusts the heights of both sides of the base board 40 according to the inclination value of the movable unit 50 measured by an inclination measuring unit described later and corrects the inclination of the movable unit 50.

Figure 6:
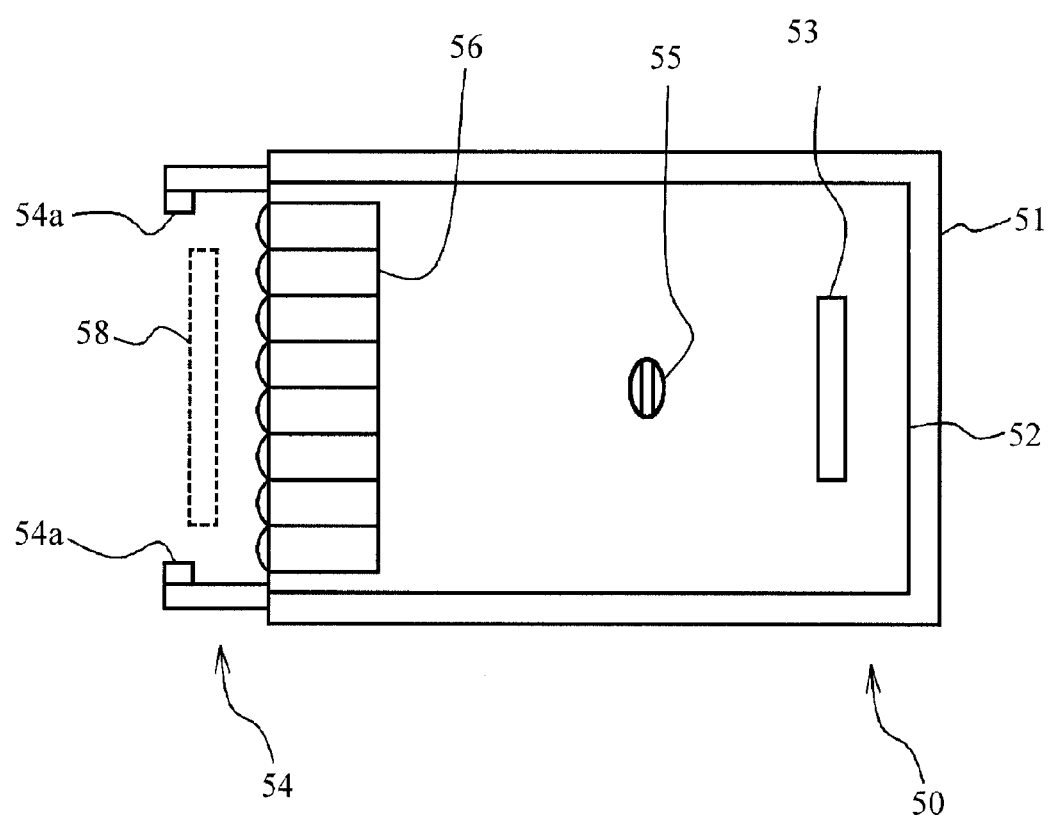
FIG. 6 is an explanatory diagram illustrating a schematic structure of the movable unit.
Figure 7:
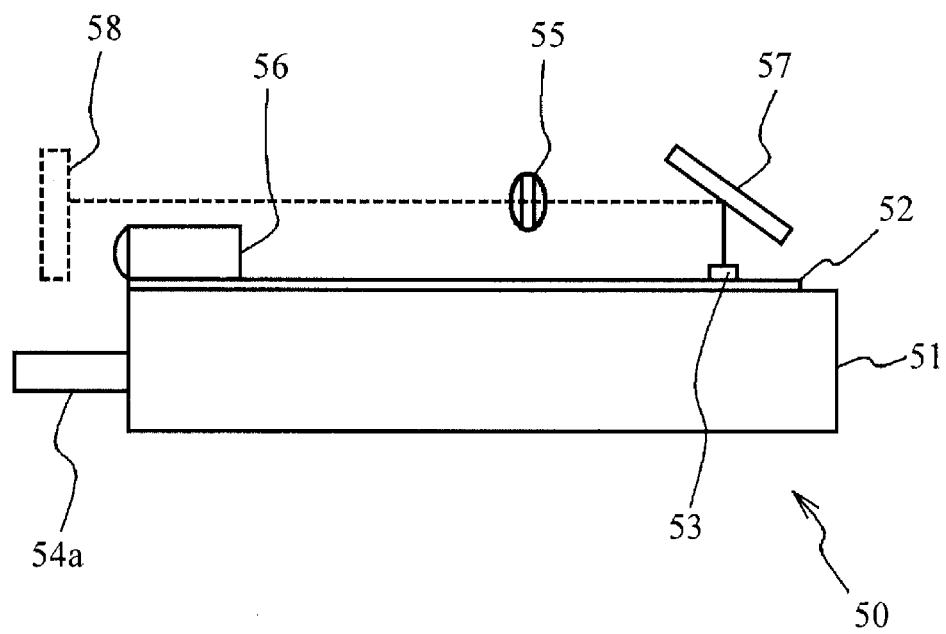
FIG. 7 is an explanatory diagram illustrating a schematic structure of the movable unit.

A description will now be given of the movable unit 50. FIG. 6 and FIG. 7 are explanatory diagrams illustrating a schematic structure of the movable unit 50. As illustrated in FIG. 6 and FIG. 7, the movable unit 50 includes a grasping unit 54 that grasps cartridges 2 stored in storage units 11a and so on.

The grasping unit 54 includes a pair of unguiform arms projecting forward from a base 51. Locking protrusions 54a are provided to tip portions of arms. The grasping unit 54 opens and closes between a first position and a second position. In the first position, arms are away from each other at a first distance in a horizontal direction. In the second position, arms are away from each other at a second distance greater than the first distance in the horizontal direction. When the grasping unit 54 is in the first position, the cartridge 2 is grasped between locking protrusions 54a. When locking protrusions 54a are placed at the second position, a space that allows a transfer of the cartridge 2 is secured between locking protrusions 54a. As described above, the cartridge 2 is grasped by the grasping unit 54. So-called rack-and-pinion mechanism may be used as the opening/closing mechanism of the grasping unit for example. An arbitrary power source may be connected to a pinion of the rack-and-pinion mechanism. An electric motor is mutually used for pinions as a power source. A stepping motor may be used for such a grasping mechanism electric motor for example.

Figure 8:
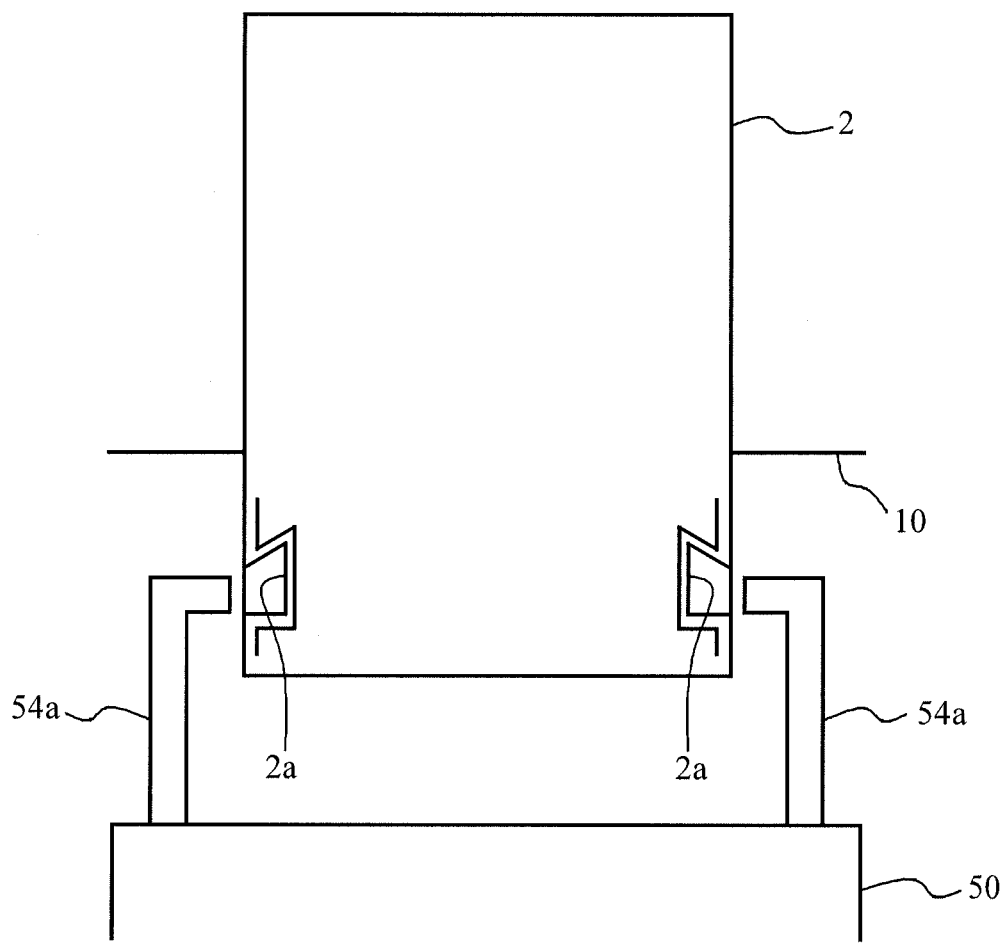
FIG. 8 is an explanatory diagram illustrating a state where a cartridge is held by a grasping unit.
Figure 9:
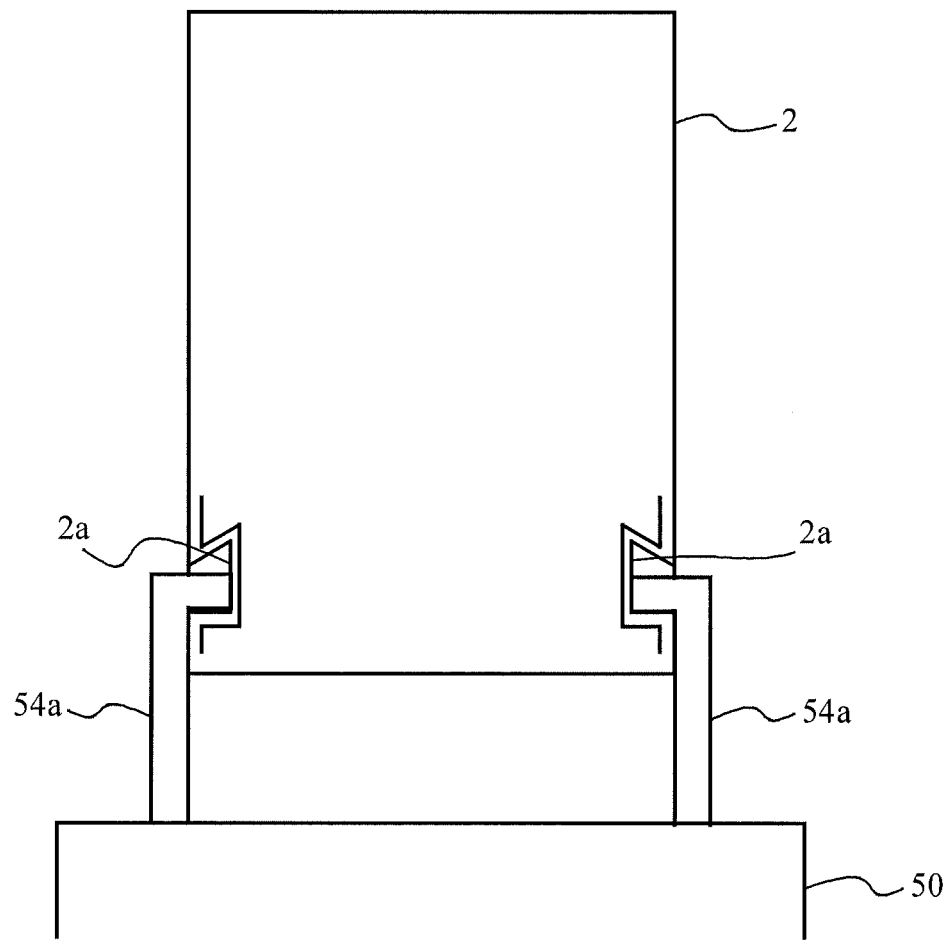
FIG. 9 is an explanatory diagram illustrating a state where a cartridge is grasped by the grasping unit.

The grasping unit 54 moves forward with being opened as illustrated in FIG. 8 so that locking protrusions 54a are coincident with positions of locking grooves 2a provided to the cartridge 2 stored in the first storage shelf 10. Then, the grasping unit 54 grasps the cartridge 2 by being closed so that locking protrusions 54a are locked to locking grooves 2a as illustrated in FIG. 9.

A printed substrate 52 is mounted on the base 51 of the movable unit 50. The printed substrate 52 expands along the horizontal surface. A line CCD (a charge-coupled device) 53 is implemented to the surface of the printed substrate 52. The line CCD 53 corresponds to a capturing unit in accordance with a present invention, and is included in an inclination measuring unit of the present invention. In the line CCD 53, pixels are aligned in one column in the horizontal direction. For example, in the line CCD 53, at least black or white can be determined in each pixel. The line CCD 53 receives lights from the vertical direction against the surface of the printed substrate 52.

In the movable unit 50, a target space 58 expanding in the horizontal direction in front of the base 51 is defined. An optical path is established between the target space 58 and the line CCD 53. A collective lens 55 is provided above the printed substrate 52 to establish the optical path. An object in the target space 58 is focused on the line CCD 53 by the function of the collective lens 55.

An LED (light emitting diode) lamp 56 is mounted on the surface of the printed substrate 52. The LED lamp 56 is provided with LED elements which are aligned in the horizontal direction, namely an LED array. The LED lamp 56 emits light to the target space 58. Accordingly, the target space 58 is lighted up by the light.

As is clear from FIG. 7, a reflecting mirror 57 is provided above the printed substrate 52 to establish the optical path. The optical path is refracted to a right angle by the reflecting mirror 57. The light is guided to the horizontal direction from the target space 58 to the reflecting mirror 57. The light is collected by the lens 55 before entering the reflecting mirror 57. The reflection light of the reflecting mirror 57 reaches the line CCD 53. The reflecting mirror 57 may be supported by an arbitrary supporting member (not illustrated) to be located above the printed substrate 52.

The line CCD 53 captures the object located in the target space 58. For example, when the cartridge 2 is grasped by the grasping unit 54, a barcode label on the cartridge 2 is placed in the target space 58. The barcode label is read by the line CCD 53. The line CCD 53 reads the first flag 31 and the second flag 32 described in detail later.

A description will now be given of the first flag 31. As the second flag 32 is same as the first flag 31, a description will be omitted.

Figure 10:
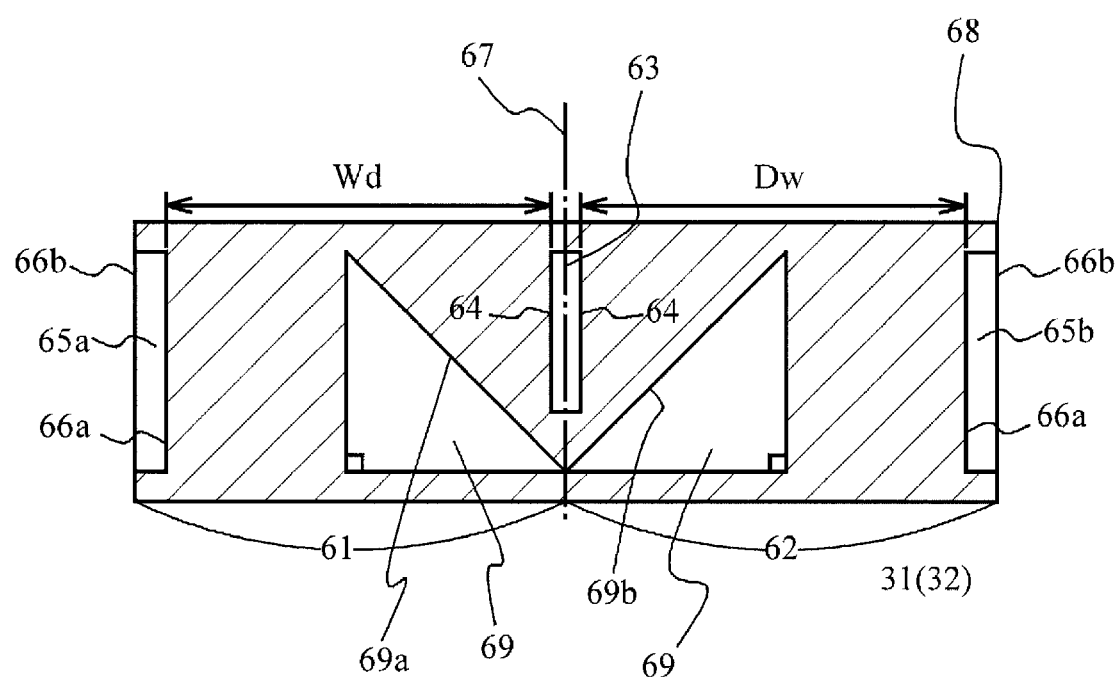
FIG. 10 is an explanatory diagram illustrating a flag.

As illustrated in FIG. 10, the first flag 31 is provided with a flat surface 68 which is a black surface indicated by a hatching in FIG. 10. A center line 67 is defined on the flat surface 68. The flat surface 68 is divided into a first region 61 on the left side and a second region 62 on the right side by the center line 67. The first and second regions 61 and 62 contact with each other at the center line 67. Color-coded patterns are drawn symmetrically from the center line 67.

The color-coded patterns include a median zone 63 which is white and extends to the vertical direction on the center line 67. The median zone 63 is separated by a pair of center indication lines 64 extending in the vertical direction in parallel with the center line 67. In the same manner, the color-coded patterns include a matched pair of white side zones 65a and 65b extending in the vertical direction in the first and second regions 61 and 62. Each of side zones 65a and 65b is separated by a pair of auxiliary indication lines 66a and 66b extending in the vertical direction in parallel with the center line 67. In side zones 65a and 65b, auxiliary indication lines 66b correspond to the right and left ends of the first flag 31. Here, a distance Wd between the left side zone 65a and the median zone 63 is equal to a distance Dw between the median zone 63 and the right side zone 65b. The distance between auxiliary indication lines 66a and 66b and the distance between center indication lines 64 are set to the same value.

The color-coded patterns include white isosceles right triangles 69 and 69 in the first and the second regions 61 and 62 respectively. The isosceles right triangle 69 in the first region 61 has a hypotenuse 69a from top left to bottom right. The isosceles right triangle 69 in the second region 62 has a hypotenuse 69b from top right to bottom left. In either of isosceles right triangles 69, one of equal sides is located in parallel with the center line 67. The other of equal sides is located on the line perpendicular to the center line.

When the first flag described above is captured by the line CCD 53 which inclines, the length of line segment of each portion varies. The line CCD 53 is mounted on the movable unit 50, but the movable unit 50 inclines because of the deflection of the base board 40 caused by the move of the movable unit 50 on the base board 40. As a result, the line CCD 53 inclines. The image of the first flag 31 captured by the line CCD 53 varies according to the degree of the inclination of the movable unit 50. In the same manner, the image of the second flag 32 varies according to the degree of the inclination of the movable unit 50. Thus, the inclination of the movable unit 50 can be measured by analyzing the image information obtained by the line CCD 53. As described above, the line CCD 53 measuring the inclination of the movable unit 50 is included in the inclination measuring unit of the present invention.

Figure 11:
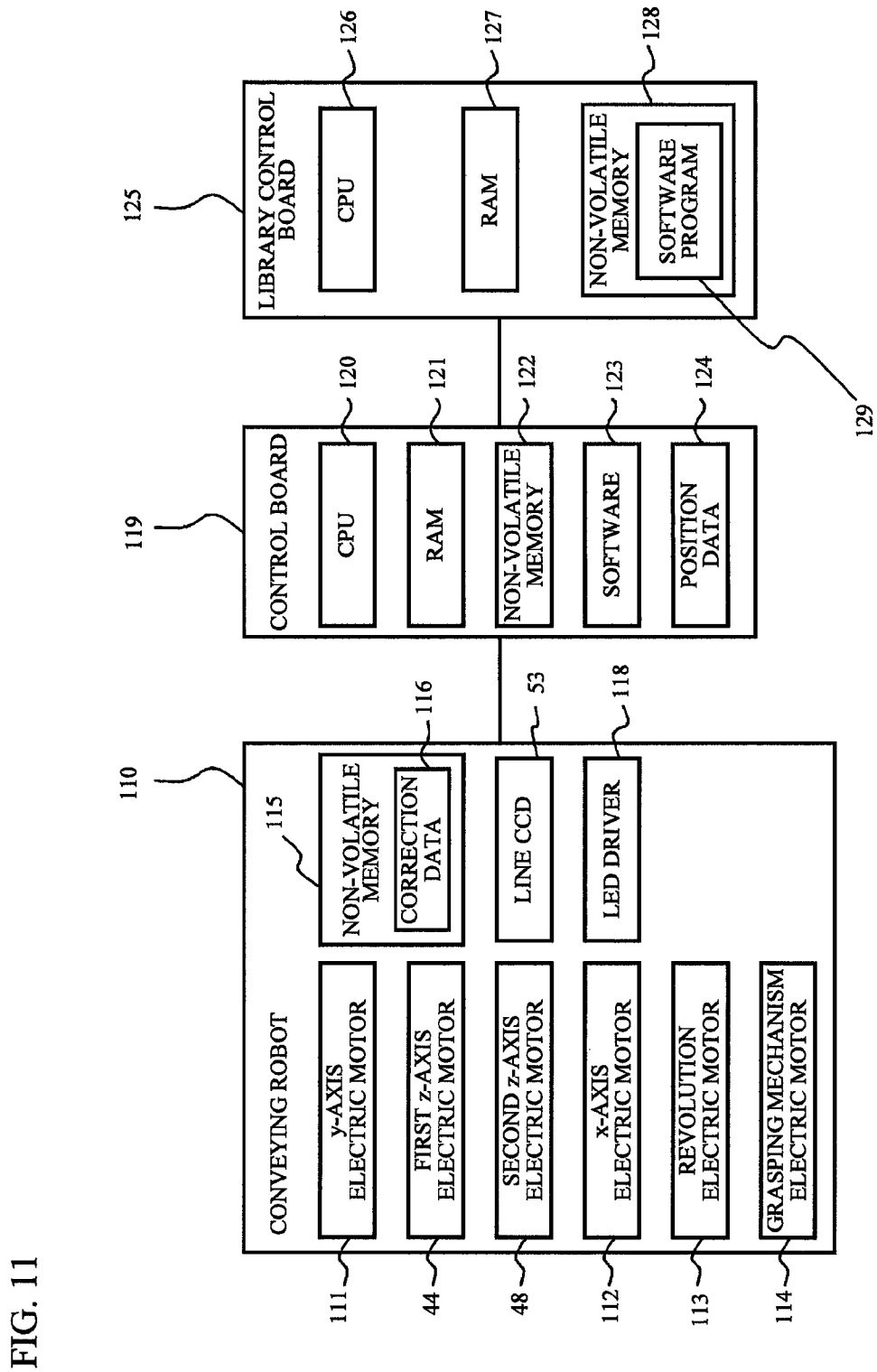
FIG. 11 is a block diagram illustrating schematic configurations of a library control board and a control board.

FIG. 11 is a block diagram illustrating schematic configurations of a library control board and a control board. As illustrated in FIG. 11, a control board 119 is coupled to the conveying robot 110. A CPU (Central Processing Unit) 120 is implemented to the control board 119. A RAM (Random Access Memory) 121 and a non-volatile memory 122 are coupled to the CPU 120. A flash memory may be used as the non-volatile memory 122 for example.

Software programs 123 and position data 124 are stored in the non-volatile memory 122. The position data 124 specifies the position of the opening of each of storage units 11a, 12a and so on. The CPU 120 executes given procedures according to software programs 123 and the position data 124 loaded to the RAM 121 temporarily for example.

A y-axis motor 111, a first z-axis motor 44, a second z-axis motor 48, an x-axis motor 112, a revolution electric motor 113, and a grasping mechanism motor 114 which are incorporated in the conveying robot 110 are coupled to the CPU 120. The CPU 120 provides drive signals to these motors. Each of motors 111, 44, 48, 112, 113, and 114 rotates at the rotational amount specified based on the drive signal. The move and the revolution of the movable unit 50 and the grasping operation of the grasping unit 54 are determined by the rotational amounts of these motors.

The line CCD 53 described previously and an LED driver 118 are coupled to the CPU 120. The black/white determination signal of each pixel is provided to the CPU 120 from the line CCD 53. The LED driver 188 makes the LED lamp 56 emit the light. When the LED lamp 56 emits the light, the drive signal is provided to the LED lamp 56 from the LED driver 118. The light emission of the LED lamp 56 is controlled based on the control signal provided to the LED driver 118 from the CPU 120.

A non-volatile memory 115 is further incorporated in the conveying robot 110. The non-volatile memory 115 stores inclination correction data 116 for each of columns 11, 12 and so on. The inclination correction unit correcting the inclination of the movable unit 50 functions based on the inclination correction data 116.

The control board 119 is coupled to a library control board 125. The library control board 125 is provided with a CPU 126, a RAM 127 and a non-volatile memory 128 for example. Software programs 129 are stored in the non-volatile memory 128. The CPU 126 executes given procedures according to software programs 129 loaded to the RAM 127 temporarily for example. The library control board 125 is coupled to a host computer.

A description will now be given of the inclination correction unit that corrects the inclination of the movable unit 50. The conveying robot 110 is provided with the base board 40, the movable unit 50, the first support post 41, and the second support post 45 as described above. More specifically, it is provided with the base board 40 which is located to face multiple columns included in the first storage shelf 10 and the second storage shelf 15. One end of the base board 40 is supported movably up and down by the first support post 41, and the other end of the base board 40 is supported movably up and down by the second support post 45. As described above, the inclination of the movable unit 50 is corrected by adjusting the height of the end portion of the base board 40 supported by the first support post 41 and the height of the end portion of the base board 40 supported by the second support post 45.

Hereinafter, a description will be given of a practical mechanism to adjust heights of end portions of the base board 40.

The conveying robot 110 is provided with the first support post 41 and the second support post 45 stood on the floor surface of the chassis 1 rotatably. Screw threads are formed on the surface of the first support post 41, and are engaged with a screw portion 40a provided to the base board 40. The first support post 41 includes a first pulley 42 in its bottom end portion, and a first belt 43 is stretched between the first pulley 42 and the first z-axis motor 44. According to this, when the first motor 44 rotates, the first support post 41 is rotated, and the height adjustment of the one end of the base board 40 can be carried out. In addition, screw threads are formed on the surface of the second support post 45 in the same manner as the first support post 41, and are engaged with a screw portion 40b provided to the base board 40. The second support post 45 includes a second pulley 46 in the bottom end portion, and a second belt 47 is stretched between the second pulley 46 and the second z-axis motor 48. According to this, when the second motor 48 rotates, the second support post 45 is rotated, and the height adjustment of the other end of the base board 40 can be carried out.

A description will now be given of a method of correcting the inclination of the movable unit 50 in the conveying robot 110 described above.

The method of correcting the inclination of the movable unit 50 includes an inclination measuring process that measures the inclination value with respect to each of columns 11, 12 and so on included in the first storage shelf 10 and the second storage shelf 15. Moreover, it includes a correction value setting process that calculates correction values of heights of one end and/or the other end with respect to each of columns 11, 12 and so on based on the inclination value measured in the inclination measuring process. Furthermore, it includes a height adjustment process that adjusts heights of one end and/or the other end of the base board 40 according to correction values calculated in the correction value setting process. Hereinafter, each process is described with reference to a flowchart.

A description will now be given of an inclination measuring process with reference to a flowchart illustrated in FIG. 12.

In the inclination measuring unit, the movable unit 50 is moved to the front of the column to be measured, and the first flag 31 provided to the storage unit 11a included in the first column 11 and the second flag 32 provided to the storage unit 14a included in the fourth column 14 are captured. The line CCD 53 provided to the movable unit 50 captures the first flag 31 and the second flag 32. The inclination value is obtained based on the acquired image information.

In a step S1, "1" is assigned as a column so as to set the first column as the column to be measured. Then, in a step S2, the movable unit 50 is moved in front of the column to be measured. At first, the movable unit 50 is moved to the front of the first column 11. At this time, the vertical position of the movable unit 50, which means the position in the z-direction, is set to the position where the movable unit 50 can read the first flag 31 and the second flag 32. More specifically, it becomes a position coincident with the storage unit 11a locating at a bottom row.

In a step S3 subsequent to the step S2, the movable unit 50 is rotated as illustrated in FIG. 4, and the line CCD 53 mounted in the movable unit 50 is directed toward the first flag 31. FIG. 4 illustrates a state where the second column 12 is a column to be measured and the movable unit 50 is directed toward the first flag 31.

In the step S4, the first flag 31 is captured by the line CCD 53, the obtained captured image is analyzed, and the measured value is obtained and recorded.

Then, in a step S5, as illustrated in FIG. 5, the movable unit 50 is rotated, and the line CCD 53 mounted on the movable unit 50 is directed toward the second flag 32. FIG. 5 illustrates a state where the second column 12 is a column to be measured and the movable unit 50 is directed toward the second flag 32.

In a step S6, the second flag 32 is captured by the line CCD 53, the obtained captured image is analyzed, and a measured value is acquired.

With above procedures, a measurement for one column is completed, and the inclination value when the movable unit 50 is placed in front of the column to be measured can be obtained.

In a step S7, "column+1" is assigned to the column so as to set the next column as the column to be measured. For example, the second column 12 is set as the column to be measured next to the first column 11. In a step S8, it is determined whether the measurements for columns to be measured are completed. In this embodiment, as the measurement will be continued till the fourth column 14, procedures from the step S2 to the step S7 are repeated till the measurement for the fourth column 14 is completed. When the column exceeds four in the step S8, the process is ended.

The library device 100 may measure all columns because it includes the first column 11 through the eighth column 19. As the first column 11 is located in the position facing the fifth column 16, the position of the movable unit 50 on the base board 40 becomes same. This is applied to other columns as well. Therefore, in this embodiment, an inclination measurement is carried out to only the first storage shelf 10.

Figure 13:
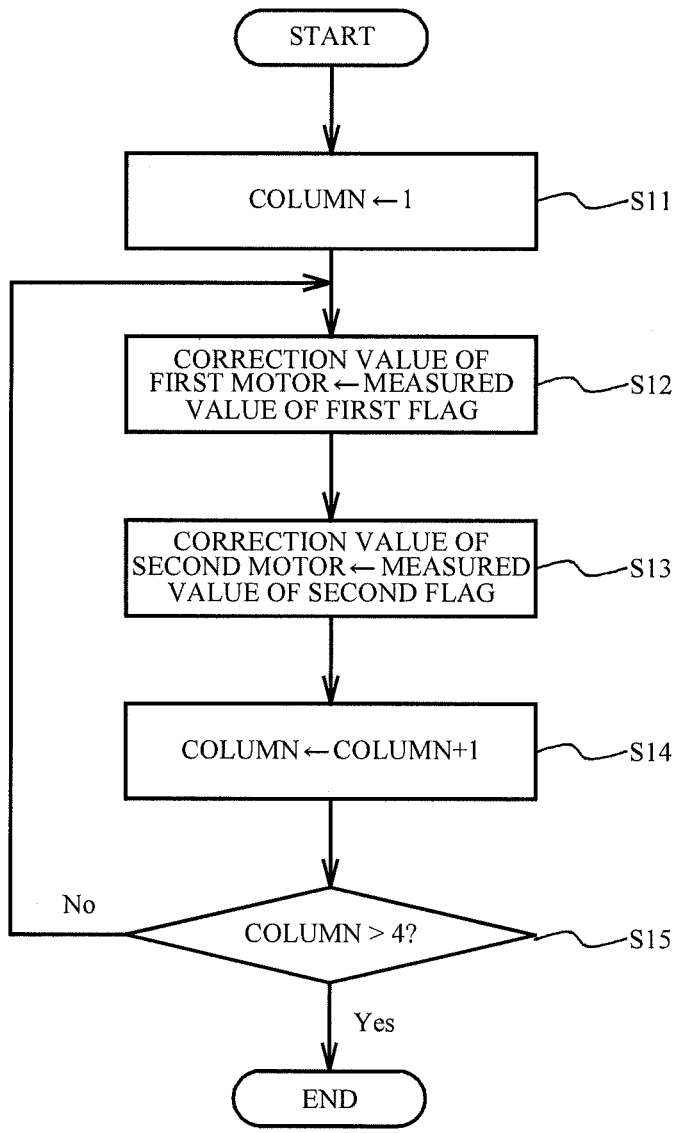
FIG. 13 is a flowchart illustrating a process of setting a correction value.

A description will now be given of a correction value setting process with a reference to a flowchart illustrated in FIG. 13.

In the step S11, "column 1" is set to specify the first column 11 as the column for the correction value setting. In a step S12, the measured value obtained and recorded by capturing the first flag 31 in the step S4 of the flowchart illustrated in FIG. 12 is set as the correction value to the first motor 44. For example, when the measured value is +1 mm, the actual position of the movable unit 50 is −1 mm against the nominal position. Thus, +1 mm is set as the correction value.

Figure 12:
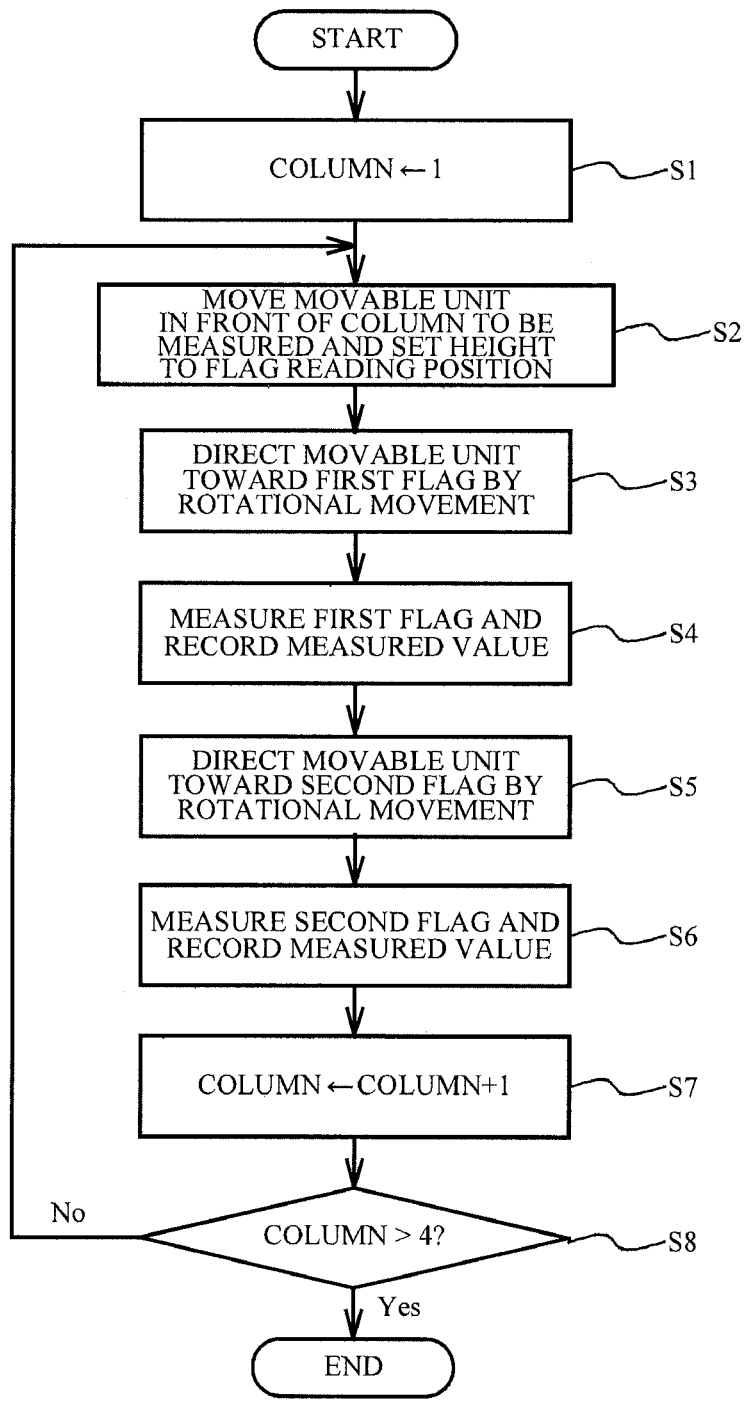
FIG. 12 is a flowchart illustrating a process of acquiring an inclination information of the movable unit.

In a step S13, a measured value obtained and recorded by capturing the second flag 32 in the step S6 of the flowchart illustrated in FIG. 12 is set as the correction value for the second motor 48. For example, when the measured value is −3 mm, the actual position of the movable unit 50 is +3 mm against the nominal position. Thus, −3 mm is set as the correction value.

Then, in a step S14, "column+1" is set as the column as to set the next column as the column for the correction value setting. For example, the second column 12 is set as the column for the correction value setting next to the first column 11. In a step S15, it is determined whether the setting of the correction value is completed to the column to be measured. In this embodiment, as the measurement is carried out till the fourth column 14, procedures from the step S12 through the step S14 are repeated till the setting of the correction value for the fourth column 14 is completed. In the step S15, when it is determined that the column exceeds four, the process is ended.

Figure 14:
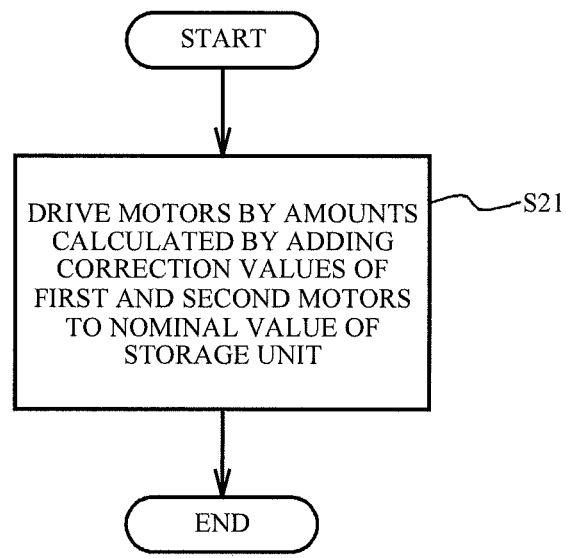
FIG. 14 is a flowchart illustrating a process of adjusting a height.

A description will now be given of a height adjustment process with reference to a flowchart illustrated in FIG. 14.

In the conveying robot 110 of the first embodiment, the first support post 41 and the second support post 45 supporting end portions of the base board 40 are rotated by the first motor 44 and the second motor 48 respectively. Thus, the height adjustments according to the correction values can be carried out simultaneously with the move toward target storage units 11a, 12a and so on. That is to say, the drive commands are supplied to the first motor 44 and the second motor 48 so that the first support post 41 and the second support post 45 are always moved upward or downward by the amounts calculated by adding correction values to nominal values of the storage unit 11a, 12a and so on. That is to say, the lifting amount is adjusted according to the flexural amount of the base board 40.

According to the processes described above, the correction of inclination of the movable unit 50 is carried out according to the position of the movable unit 50. According to this, the inclination of the grasping unit 54 provided to the movable unit 50 is corrected. As a result, the inclination of the movable unit 50 on the base board 40 where the flexure occurs is corrected appropriately, and the cartridge 2 can be grasped by the grasping unit 54.

Second Embodiment

A description will now be given of a second embodiment with reference to FIG. 15 through FIG. 27.

A library device 200 in accordance with the second embodiment is provided with a conveying robot 210 instead of the conveying robot 110 provided to the library device 100 of the first embodiment. The conveying robot 210 is provided with the inclination correction unit that corrects the inclination of the movable unit 50 in the same manner as the conveying robot 110. The conveying robot 210 includes the base board 40, the movable unit 50, the first support post 41, and the second support post 45. More specifically, it includes the base board 40 which is located to face the multiple columns included in the first storage shelf 10 and the second storage shelf 15. One end of the base board 40 is supported movably up and down by the first support post 41, and the other end of the base board 40 is supported movably up and down by the second support post 45. As described, the inclination of the movable unit 50 is corrected by adjusting the height of the end portion of the base board 40 supported by the first support post 41 and the height of the end portion of the base board 40 supported by the second support post 45. These are same as the conveying robot 110 of the first embodiment. However, the mechanism of adjusting heights of end portions of the base board 40 is different from each other. Hereinafter, a description will be given of the second embodiment focusing on the difference from the first embodiment. Same reference numerals are assigned to components common with the first embodiment, and the detail description of them is omitted.

Figure 15:
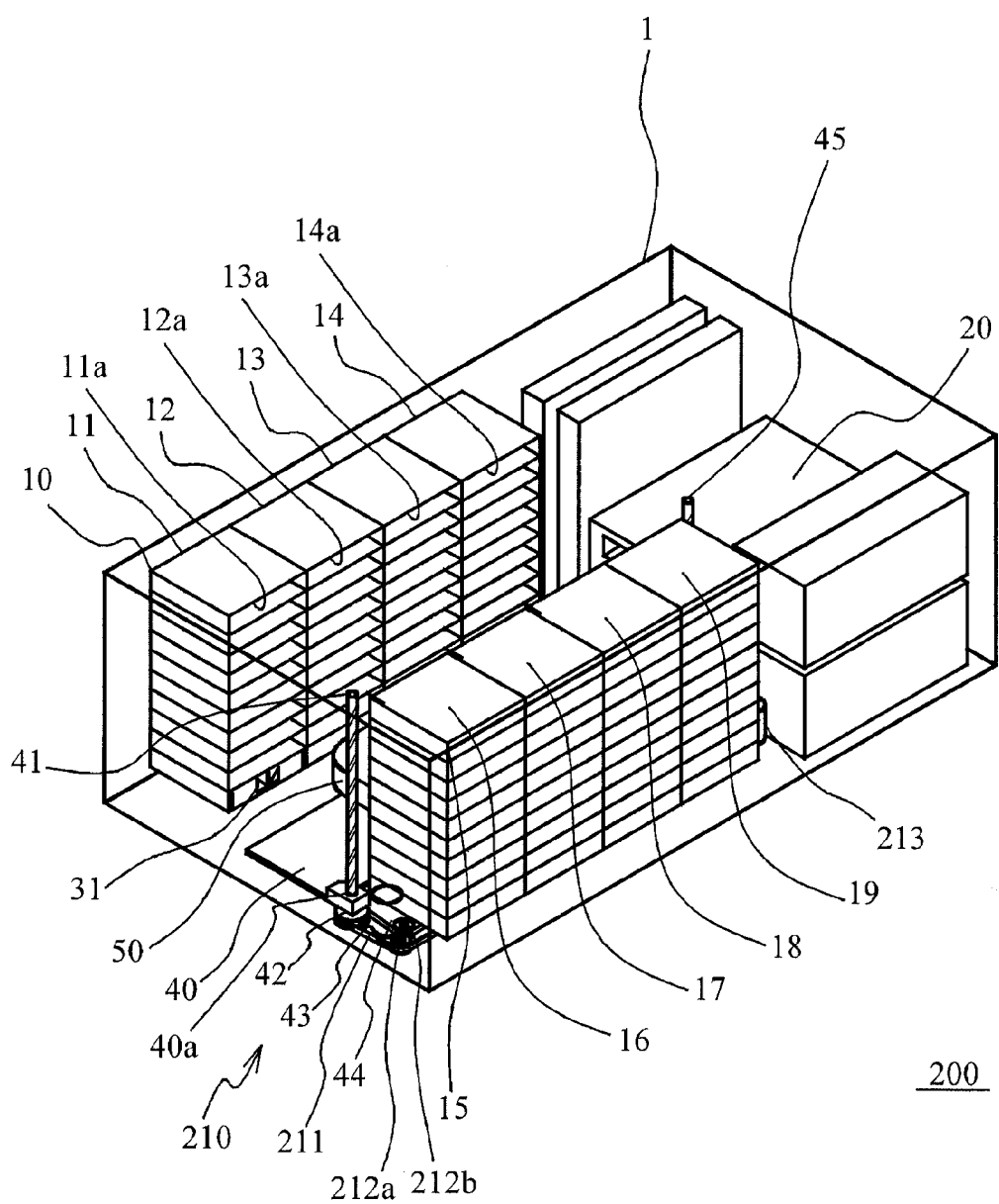
FIG. 15 is an explanatory diagram illustrating a schematic structure of a library device in accordance with a second embodiment.
Figure 16:
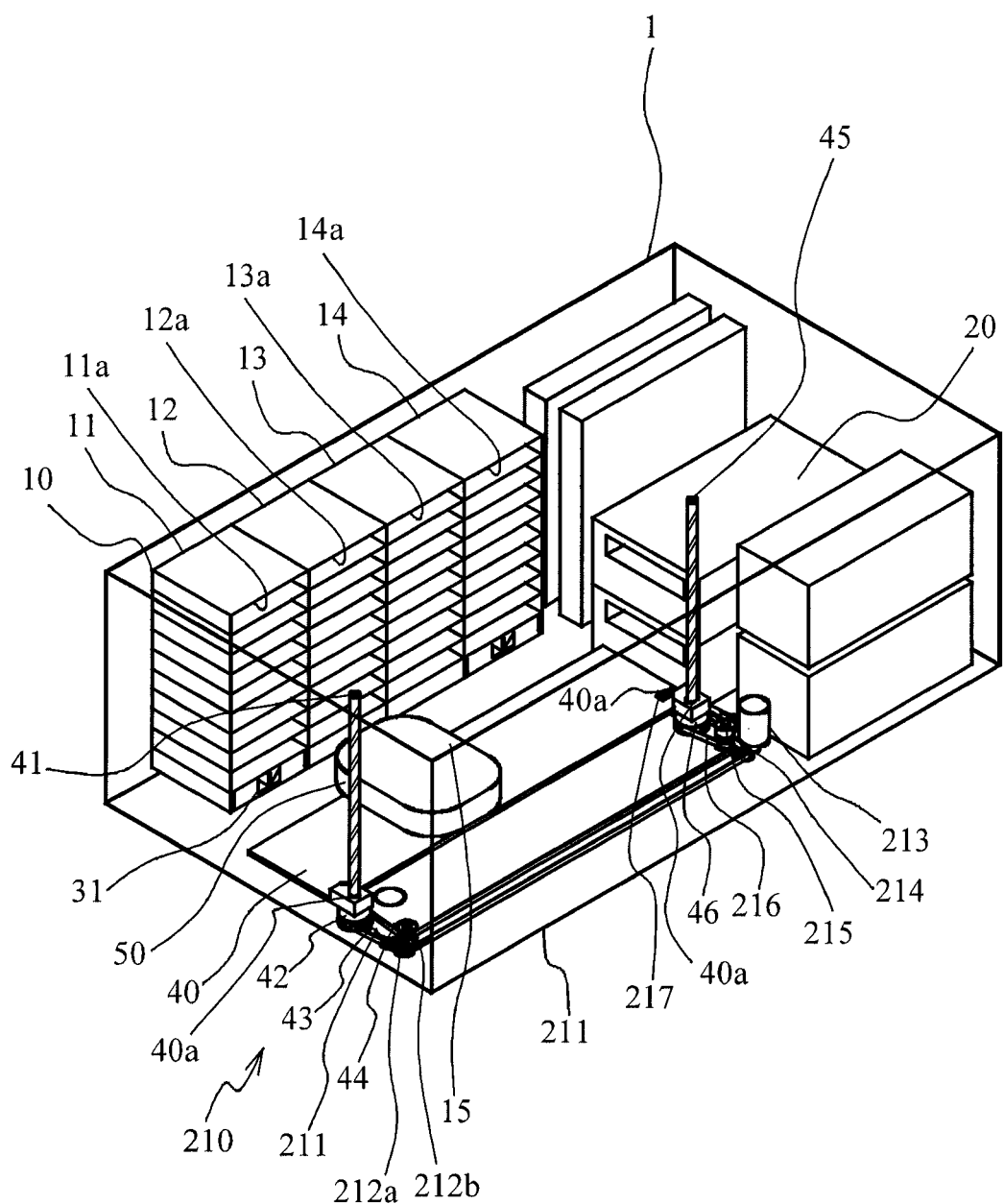
FIG. 16 is an explanatory diagram illustrating a state where the second storage shelf is removed from the library device.
Figure 17:
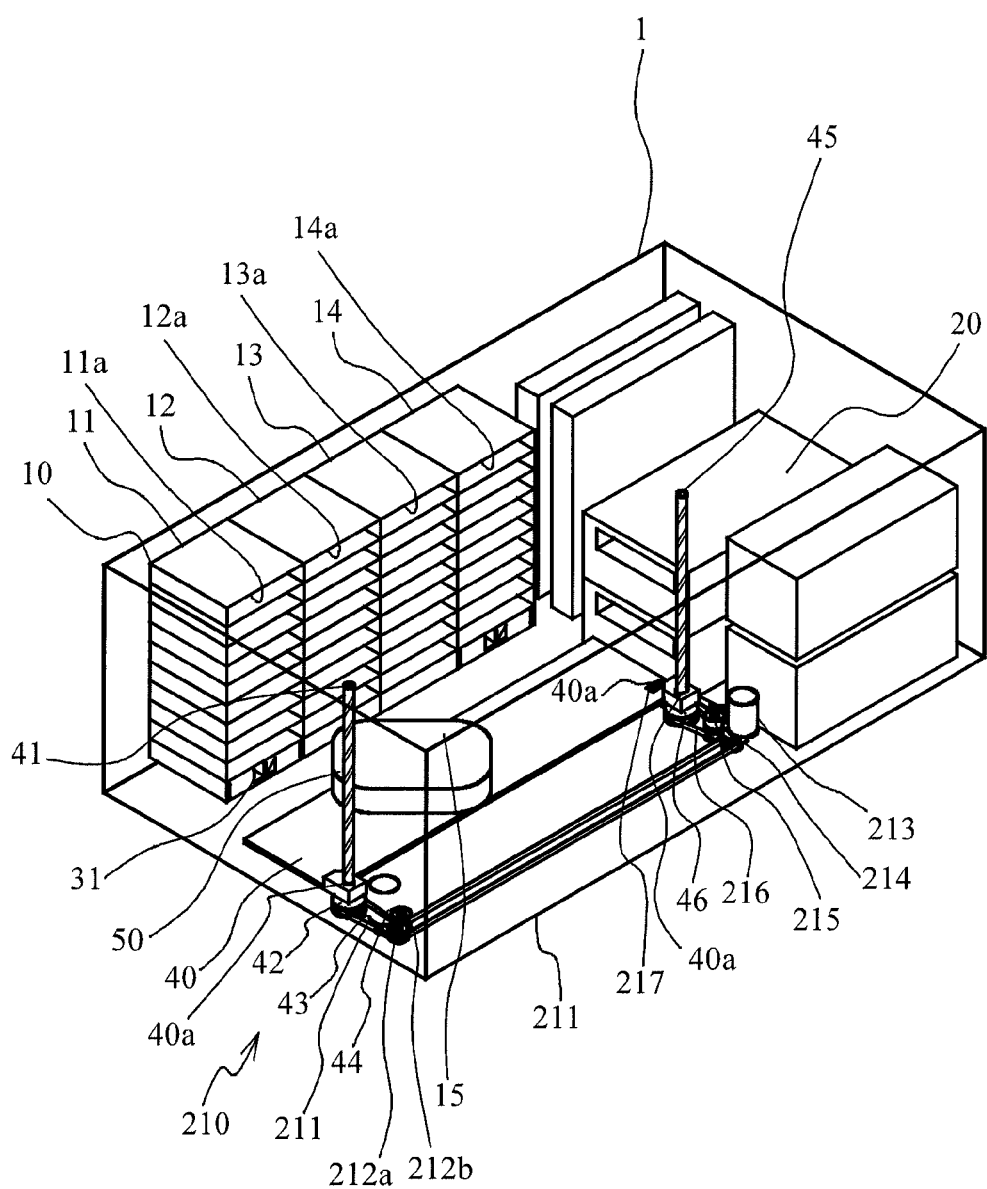
FIG. 17 is an explanatory diagram illustrating a state where the movable unit is moved to the front of the second column and directed toward the first flag.
Figure 18:
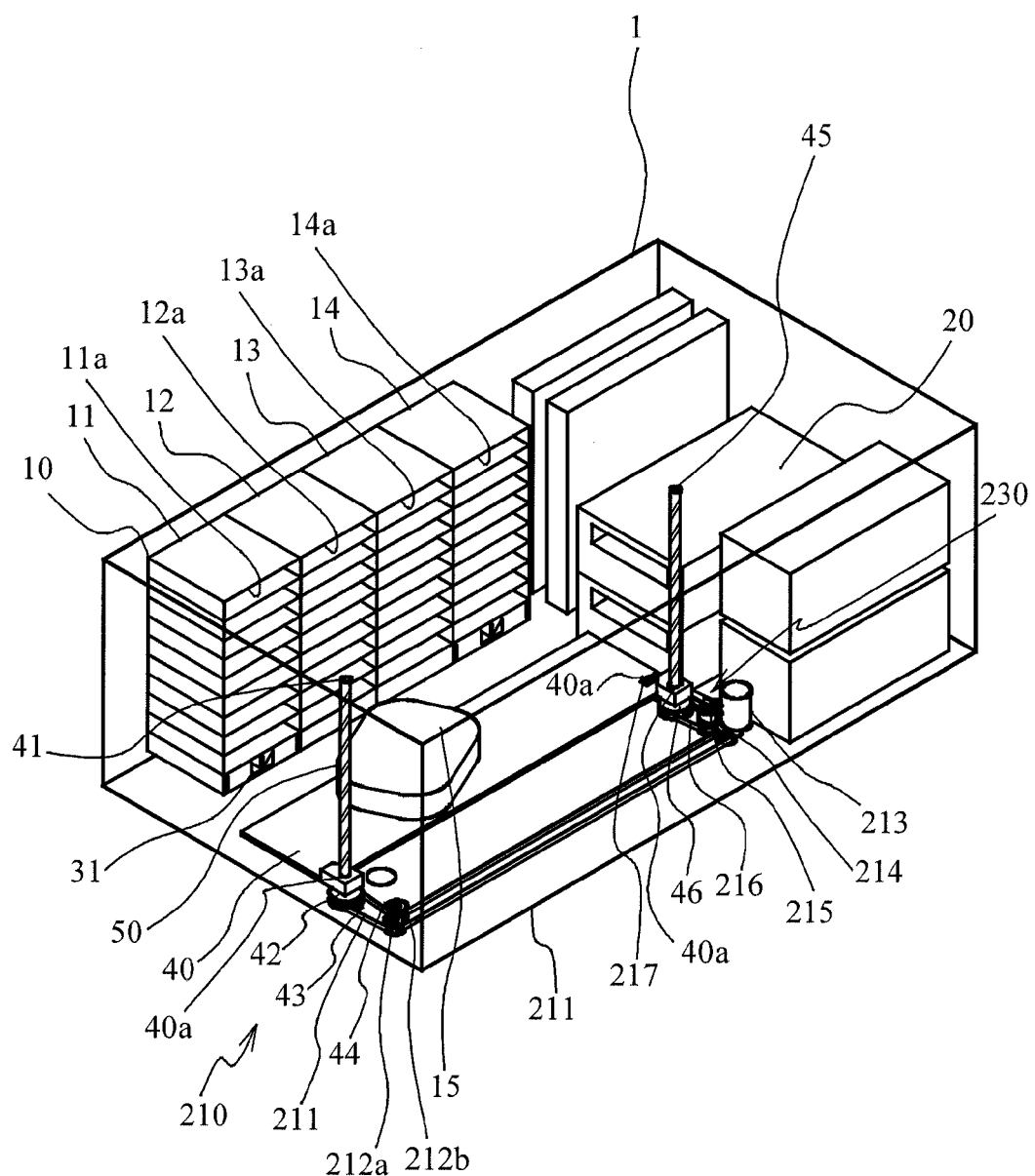
FIG. 18 is an explanatory diagram illustrating a state where the movable unit is moved to the front of the second column and directed toward the second flag.
Figure 19:
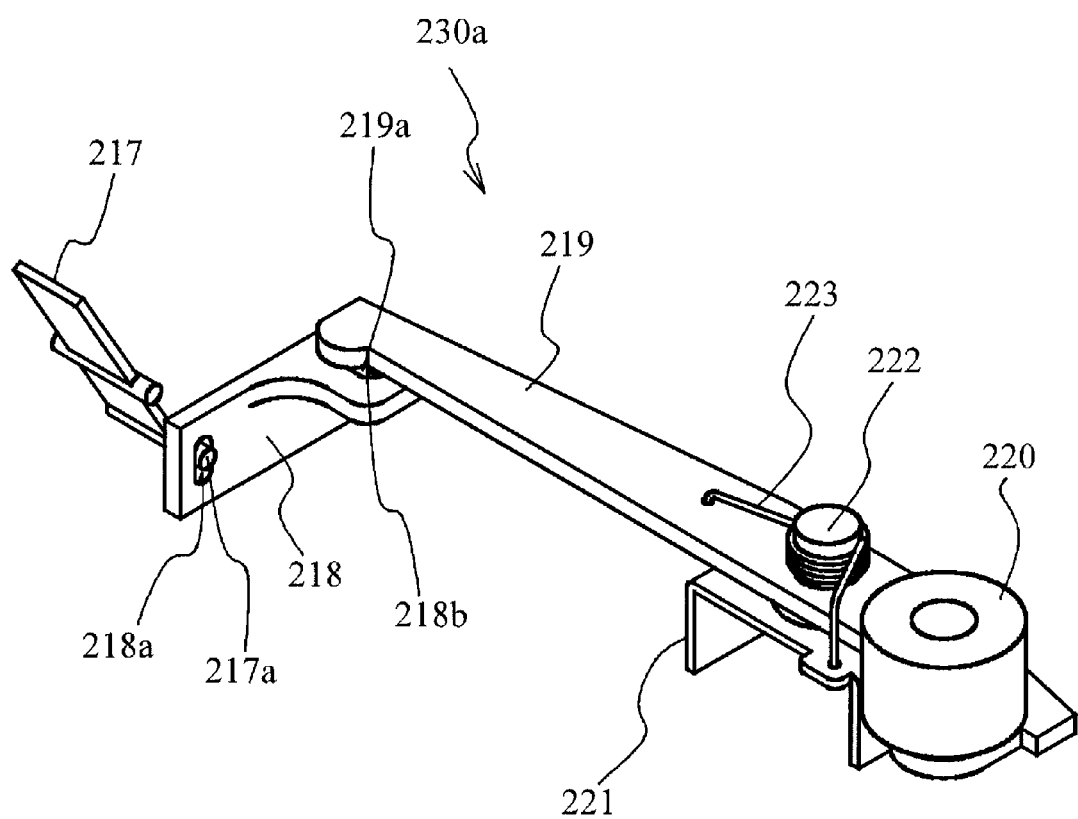
FIG. 19 is a perspective view of a link mechanism included in a power transmission unit.

FIG. 15 is an explanatory diagram illustrating a schematic structure of the library device 200 in accordance with the second embodiment. FIG. 16 is an explanatory diagram illustrating a state where the second storage shelf 15 is removed from the library device 200. FIG. 17 is an explanatory diagram illustrating the state where the movable unit 50 is moved to the front of the second column, and directed toward the first flag 31. FIG. 18 is an explanatory diagram illustrating the state where the movable unit 50 is moved to the front of the second column, and directed toward the second flag 32. As is clear from these figures, in the conveying robot 210, the first support post 41 and the second support post 45 are rotated by a single motor 213.

Hereinafter, a description will be given of a practical mechanism of adjusting heights of end portions of the base board 40. The conveying robot 210 is provided with the first support post 41 and the second support post 45 stood on the floor surface of the chassis 1 rotatably. Screw threads are formed on the surface of the first support post 41, and are engaged with the screw portion 40a provided to the base board 40. The first support post 41 is provided with the first pulley 42 to a bottom end portion. Screw threads are formed on the surface of the second support post 45 in the same manner as the first support post 41, and are engaged with the screw portion 40b provided to the base board 40. The second support post 45 is provided with the second pulley 46 to the bottom end portion.

The motor 213 rotating the first support post 41 and the second support post 45 is located to the side near the second support post 45. A power transmitting unit 230 which includes a switching unit capable of switching the transmission state of the power of the motor 213 to the second support post 45 is located to the side near the second support post 45.

Figure 20:
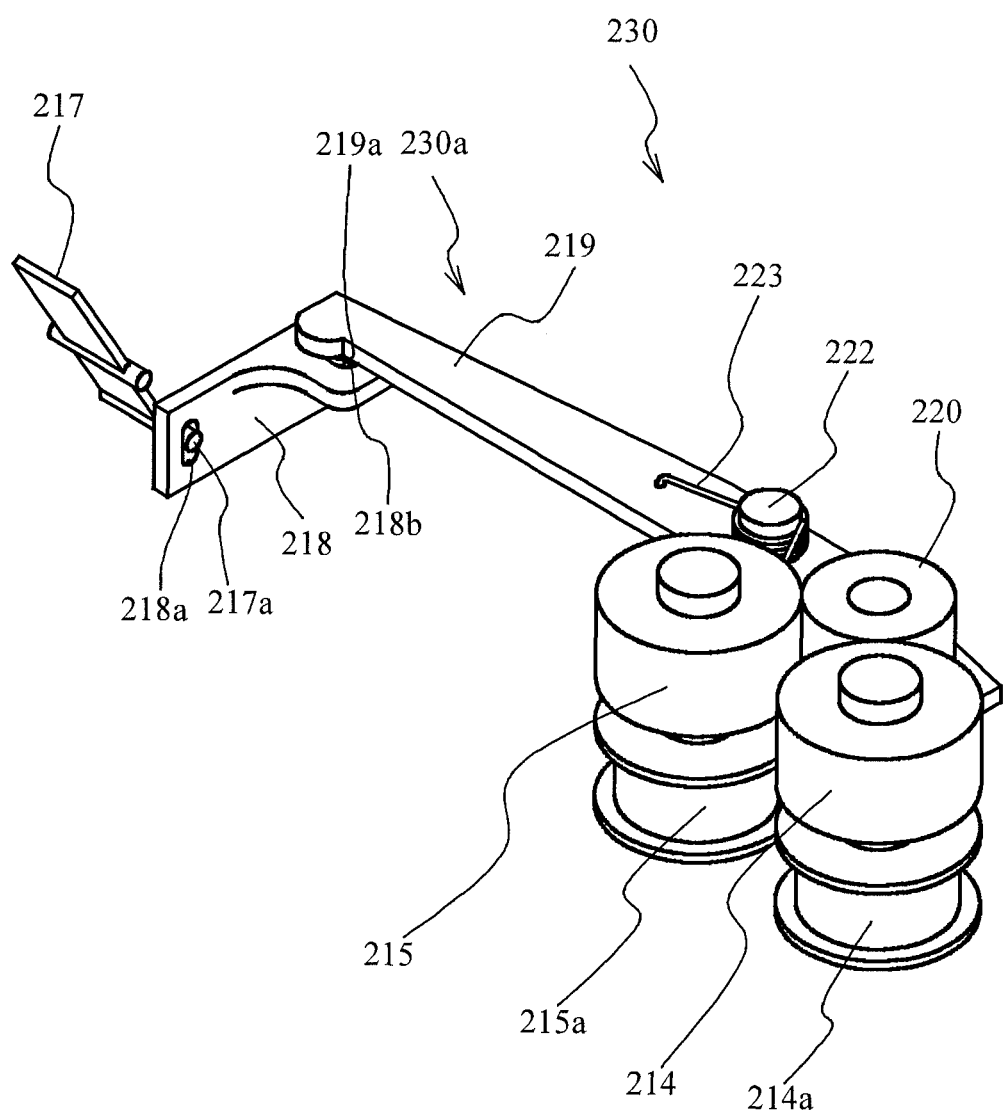
FIG. 20 is a perspective view of the power transmission unit in a state where a power can be transmitted.
Figure 21:
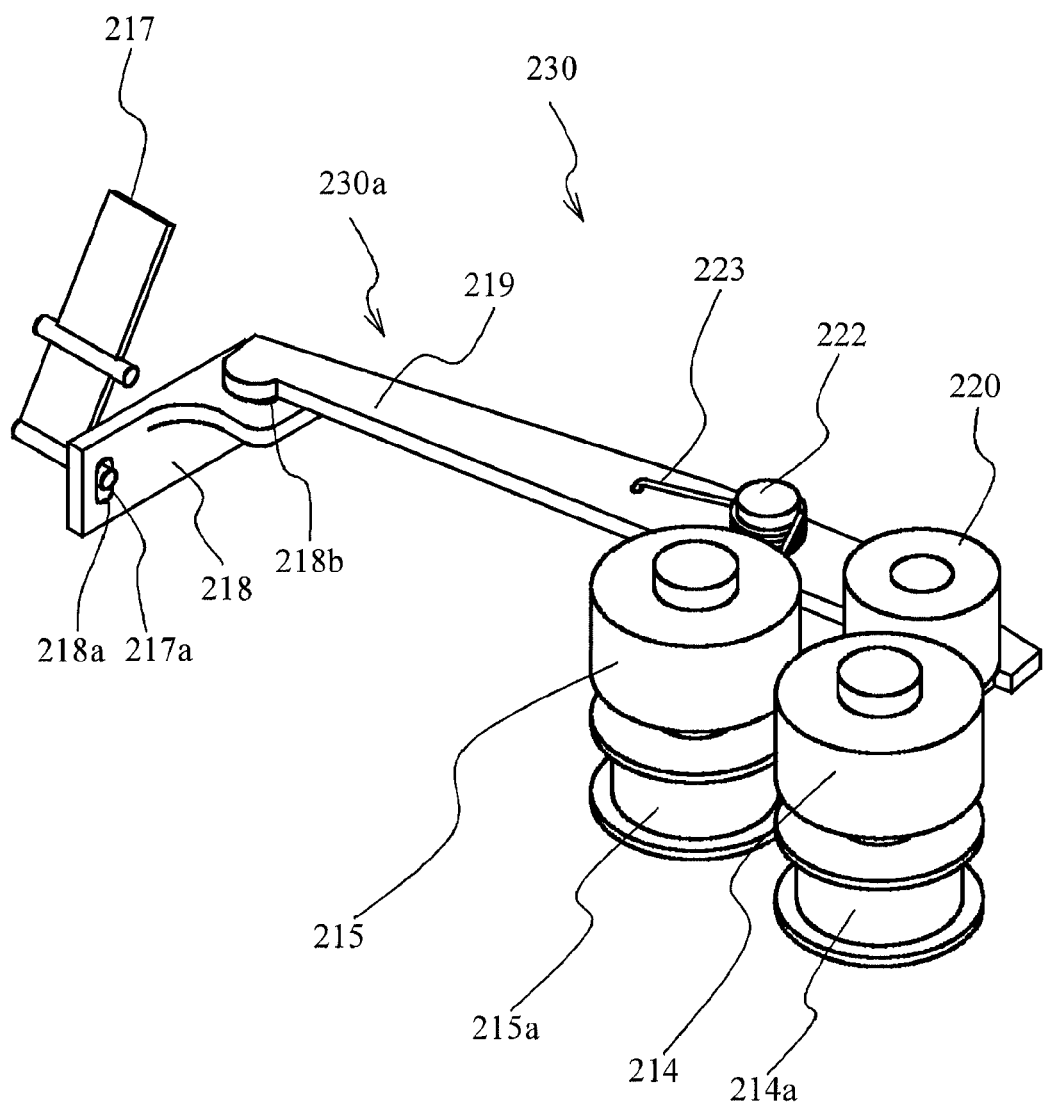
FIG. 21 is a perspective view of the power transmission unit in a state where a power is not transmitted.

The power transmitting unit 230 is provided with a link mechanism 230a, a first gear 214, and a second gear 215 as illustrated in FIG. 20 and FIG. 21. The link mechanism 230a illustrated in FIG. 19 corresponds to a switching unit of the present invention, and includes a switching member 217 that operates by the move of the movable unit 50, and a third gear 220 that moves in conjunction with the switching member 217 and is a connecting member that connects the motor 213 and the second support post 45.

More specifically, a protrusion 217a provided to the switching member 217 is engaged with a first engagement hole 218a provided to a first arm member 218. An engagement protrusion 219a provided to a second arm member 219 is engaged with a second engagement hole 218b provided to the first arm member 218. The third gear 220 is mounted on the end portion of the second arm member 219 rotatably. The second arm member 219 is rotatably mounted on a seat 221 fixed to the floor surface of the chassis 1 via a pin 22. A spring 223 that brings the second arm member 219 back to the original position is mounted between the seat 221 and the second arm member 219. The switching member 217 is mounted so as to protrude to the top side of the base board 40 through the hole 40a provided to the base board 40.

The first gear 214 is mounted on the floor surface of the chassis 1 rotatably. The first gear 214 engages with a pinion gear provided to the motor 213. The first gear 214 is provided with a third pulley 214a to its bottom end. A third belt 211 is stretched between the third pulley 214a and the first pulley 42 provided to the bottom side of the first support post 41 via idle rings 212a and 212b. According to this, the first support post 41 is rotated, and the height adjustment of one end of the base board 40 can be carried out.

The second gear 215 is mounted on the floor surface of the chassis 1 rotatably. The second gear 215 is linked to the first gear 214 by engaging with the third gear 220, and the rotation of the motor 213 is transmitted. The second gear 215 is provided with a fourth pulley 215a to its bottom end. A fourth belt 216 is stretched between the fourth pulley 215a and the second pulley 46 provided to the bottom side of the second support post 45. According to this, the second support post 45 is rotated, and the height adjustment of the other end of the base board 40 is carried out.

Figure 22:
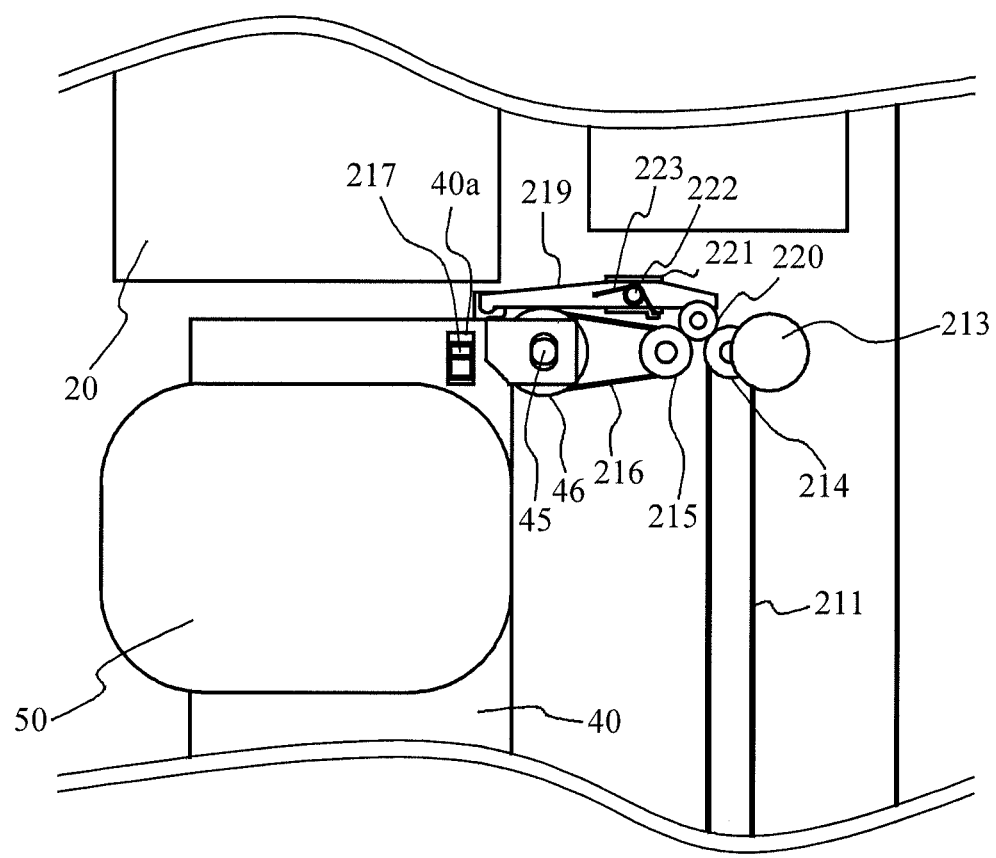
FIG. 22 is an explanatory diagram illustrating a vicinity of the power transmission unit which is incorporated in the library device and is in a state where a power can be transmitted.
Figure 23:
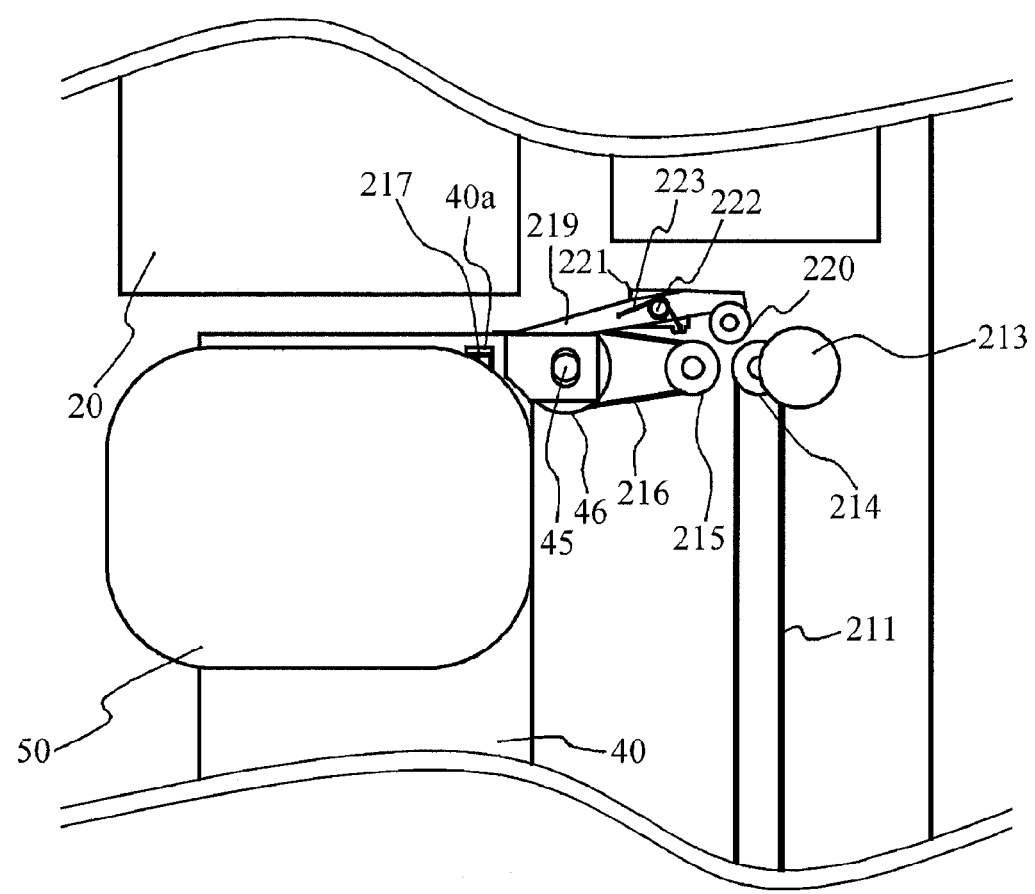
FIG. 23 is an explanatory diagram illustrating a vicinity of the power transmission unit which is incorporated in the library device and is in a state where a power is not transmitted.
Figure 24:
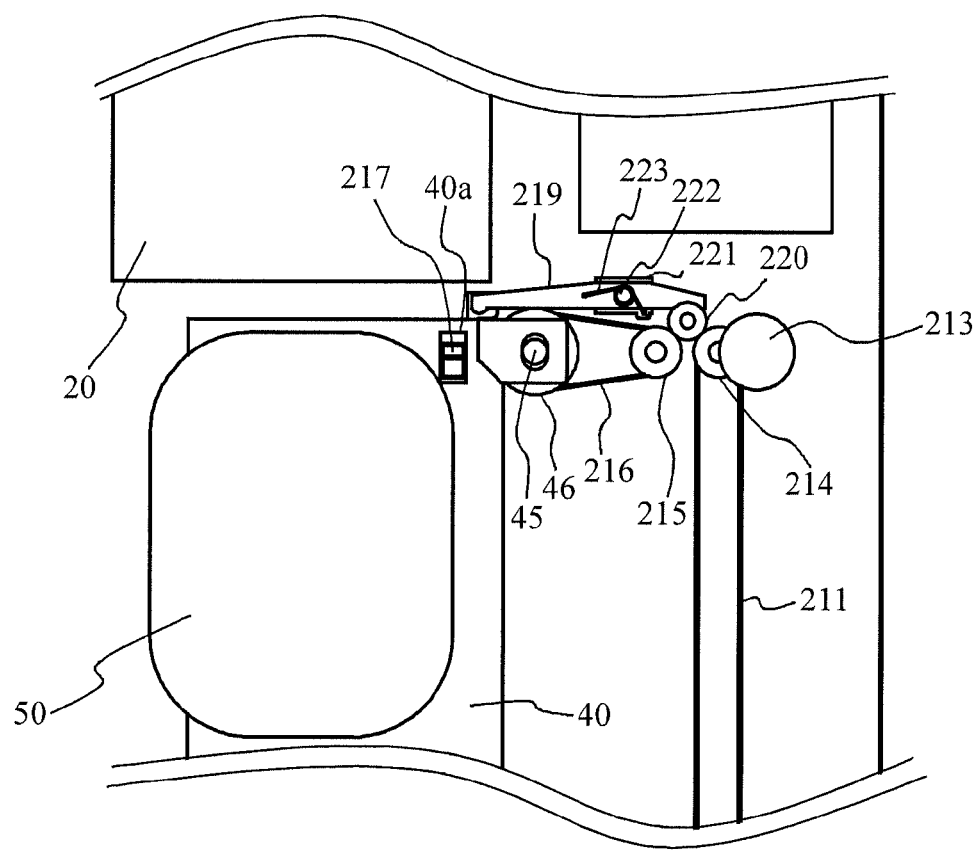
FIG. 24 is an explanatory diagram illustrating a state of the movable unit when transferring a cartridge from a cartridge drive device.

Here, a description will now be given of the operation of the power transmitting unit 230. FIG. 20 is a perspective view of the power transmitting unit 230 in a state where the power can be transmitted. FIG. 21 is a perspective view of the power transmitting unit 230 in a state where the power is not transmitted. FIG. 22 is an explanatory diagram of the vicinity of the power transmitting unit 230 which is incorporated in the library device 200 and is in a state where the power can be transmitted. FIG. 23 is an explanatory diagram of the vicinity of the power transmitting unit 230 that is incorporated in the library device 200 and in a state where the power is not transmitted. FIG. 24 is an explanatory diagram illustrating a state of the movable unit 50 when transferring a cartridge from the cartridge drive device 20.

As illustrated in FIG. 22, when the movable unit 50 is away from the end portion on the second support post 45 side, the switching member 217 is leaned forward as illustrated in FIG. 20. At this time, the second arm member 219 is biased by the spring 223, and moves the third gear 220 to the direction where it engages with the first gear 214 and the second gear 215. According to this, the rotation of the motor 213 is transmitted to the first gear 214, the third gear 220, and the second gear 215 in this order. As a result, the fourth pulley 215a is rotated, and the second support post 45 is rotated by the fourth belt 216. That is to say, when the second support post 45 is desired to be rotated, the movable unit 50 is kept at the position where the switching member 217 is not pressed.

On the other hand, as illustrated in FIG. 23, when the movable unit 50 approaches the end portion of the second support post 45 and presses the switching member 217, the switching member 217 is leaned back as illustrated in FIG. 21. At this time, the second arm member 219 is rotated around a pin 222 withstanding the force of the spring 233, and moves the third gear 220 away from the first gear 214 and the second gear 215. According to this, the transmission of the rotation of the motor 213 to the second gear 215 is cut off. That is to say, when the rotation of the second support post 45 is desired to be stopped, the movable unit 50 is moved to the position where the switching member 217 is pressed.

Figure 25:
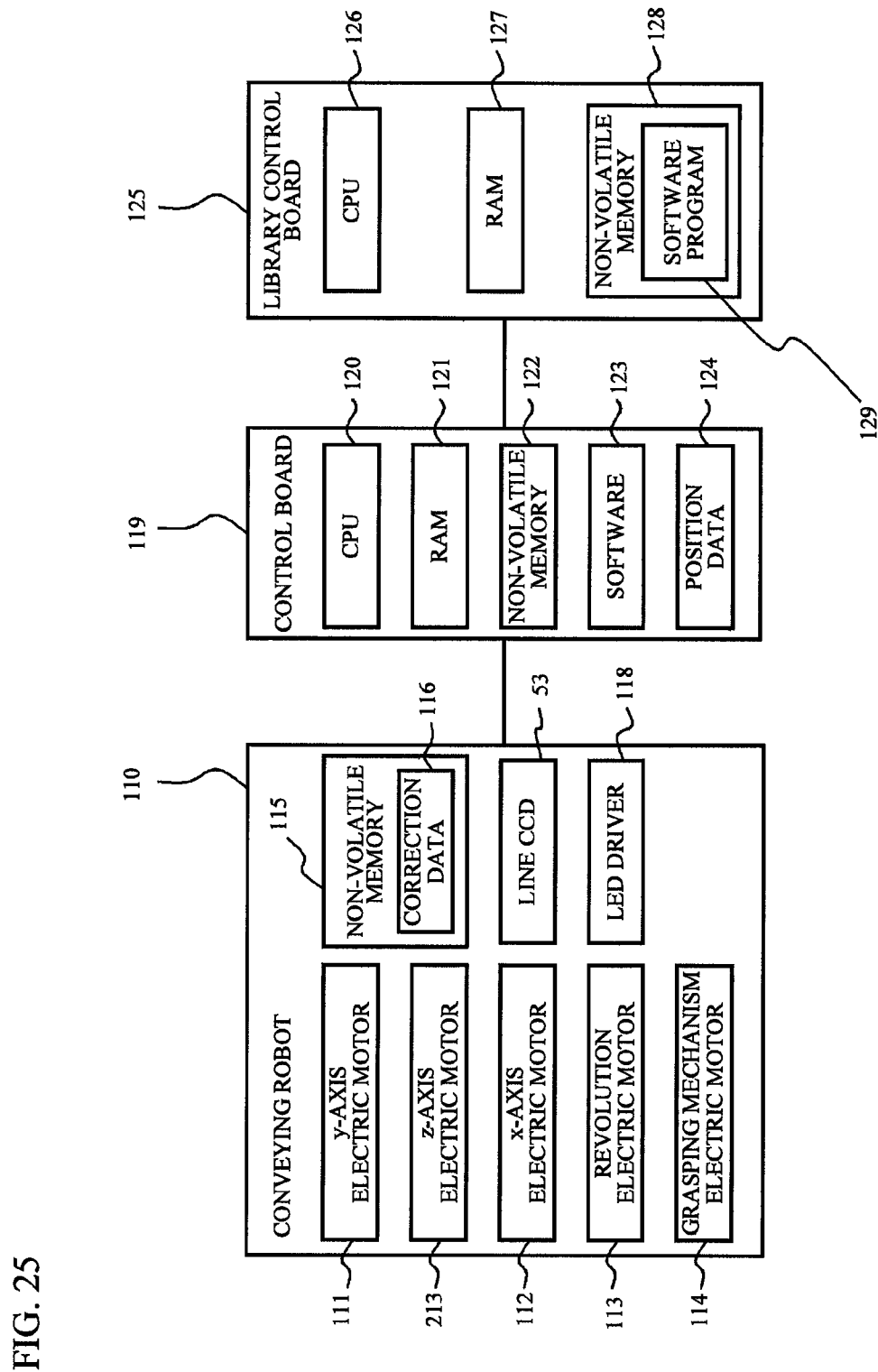
FIG. 25 is a block diagram illustrating schematic configurations of a library control board and a control board.

FIG. 25 is a block diagram illustrating schematic configurations of the library control board and the control board provided to the library device 200. Configurations are same as the library device 100 of the first embodiment except that the number of the z-axis motor is one.

A description will now be given of a method of correcting the inclination of the movable unit 50 in the conveying robot 210 described above. The method of correcting the inclination of the movable unit 50 includes an inclination measuring process that measures the inclination value with respect to each of columns 11, 12 and so on included in the first storage shelf 10 and the second storage shelf 15. In addition, it includes a correction value setting process that calculates correction values of the heights of one end and/or the other end of the base board 40 with respect to each of columns 11, 12 and so on. Furthermore, it includes a height adjustment process that carries out the height adjustment of one end and/or the other end of the base board 40 according to the correction values calculated in the correction value setting process. These are same as the conveying robot 110 of the first embodiment. As the inclination measuring process is same as the process described with the flowchart in FIG. 12, a detail description will be omitted. Hereinafter, the correction value setting process and the height adjustment process will be described.

Figure 26:
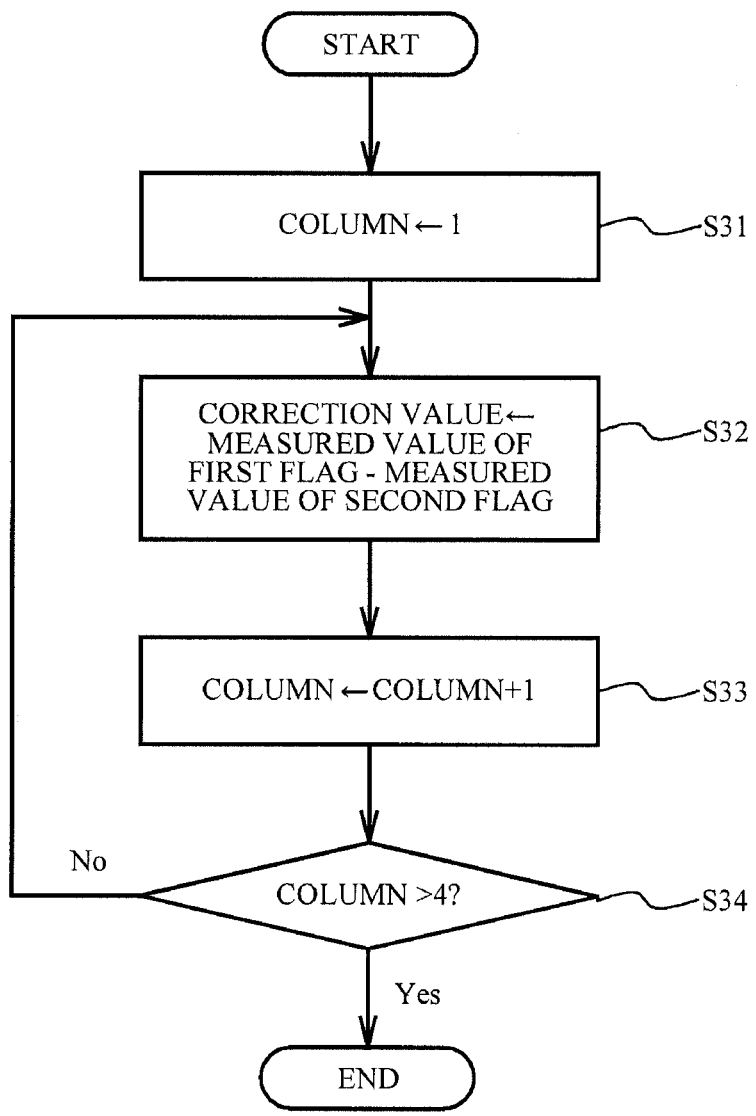
FIG. 26 is a flowchart illustrating a process of setting a correction value.

A description will be given of the correction value setting process with reference to the flowchart illustrated in FIG. 26.

In a step S31, "column 1" is set to specify the first column 11 as the column for the correction value setting. In a step S32, the measured value obtained by capturing the second flag 32 in the step S6 illustrated in FIG. 12 is subtracted from the measured value obtained by capturing the first flag 31 in the step S4 illustrated in FIG. 12. And the value calculated from the subtraction is set as the correction value.

Then, in a step S33, "column+1" is set as a column so as to set the next column as the column for the correction value setting. For example, the second column 12 is set as the column for the correction value setting next to the first column 11. In a step S34, it is determined whether the setting of the correction value to the column to be measured is completed. In this embodiment, the measurement is carried out till the fourth column 14, the procedures from the step 32 to the step 33 are repeated till the setting of the correction value for the fourth column 14 is completed. When it is determined that the column exceeds four in the step S34, the process is ended.

Figure 27:
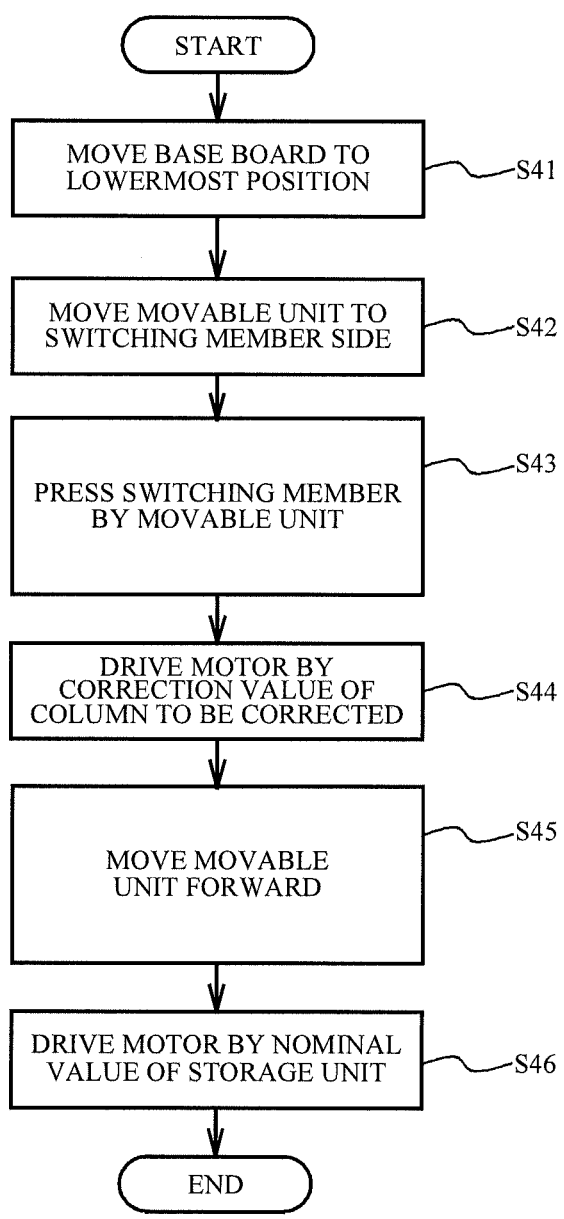
FIG. 27 is a flowchart illustrating a process of adjusting a height.

A description will now be given of a height adjustment process with reference to the flowchart illustrated in FIG. 27. In a step S41, the base board 40 is moved down to the lowermost position. According to this, the switching member 217 is exposed from the hole 40a provided to the base board 40. In a step S42, the movable unit 50 is moved to the switching member 217 side. Then, in a step S43, the switching member 217 is pressed by the movable unit 50, and the state illustrated in FIG. 23 is achieved. According to this, the third gear 220 moves away from the first gear 214 and the second gear 215. As a result, the rotation of the motor 213 is not transmitted to the second support post 45.

In a step S44, the motor 213 is driven by the correction value of the target column, and the first support post 41 is rotated. According to this, the height of one end of the base board 40 is adjusted, and the inclination of the movable unit 50 is corrected. At this time, as the motor 213 can be rotated positively and negatively, the inclination of the movable unit 50 can be corrected regardless of the position of the base board 40.

In the step S45, the movable unit 50 is moved forward. That is to say, the movable unit 50 is moved away from the switching member 217 to achieve the state illustrated in FIG. 22. According to this, the third gear 220 engages with the first gear 214 and the second gear 215. As a result, the rotation of the motor 213 is transmitted to the second support post 45. In a step S46, the motor 213 is driven by the nominal value corresponding to the column of the target storage unit.

With processes described above, the inclination of the movable unit 50 is corrected according to the position of the movable unit 50. According to this, the inclination of the grasping unit 54 provided to the movable unit 50 is also corrected. As a result, the inclination of the movable unit 50 on the base board 40 where the flexure occurs is corrected properly, and the cartridge 2 can be grasped by the grasping unit 54.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

For example, library devices storing cartridges are described in above embodiments, but the present invention disclosed in this specification can be applied to library devices storing other objects.

What is claimed is:

1. A library device comprising:
   a storage shelf that includes storage units aligned in a plurality of columns; and
   a conveying robot that grasps and conveys cartridges stored in the storage units,
   wherein the conveying robot includes:
      a base board that is located to face the plurality of columns, one end of the base board being supported movably up and down by a first support post, and another end of the base board being supported movably up and down by a second support post;
      a movable unit that includes a grasping unit that grasps the cartridges stored in the storage units and moves on the base board;
      an inclination measuring unit that measures an inclination of the movable unit; and
      an inclination correction unit that adjusts heights of both ends of the base board according to an inclination value of the movable unit measured by the inclination measuring unit and corrects the inclination of the movable unit,
   each of the first support post and the second support post includes a part where a first engage portion is formed that is engaged with a second engage portion provided to the base board and supports the base board, and
   the inclination correction unit includes a first motor that drives the first support post and a second motor that drives the second support post.

2. A method of correcting an inclination of a movable unit provided to a library device, the library device including a storage shelf that includes storage units aligned in a plurality of columns; and a conveying robot that grasps and conveys cartridges stored in the storage units, and the movable unit including a grasping unit and moving on a base board provided to the conveying robot, the method comprising:
   measuring an inclination value with respect to each of the aligned columns;
   calculating correction values of heights of one end and/or another end of the base board with respect to each of the aligned columns based on the inclination value measured in the measuring; and
   adjusting the heights of the one end and/or the another end of the base board according to correction values calculated in the calculating,
   wherein the base board is located to face the plurality of columns, one end of the base board being supported movably up and down by a first support post, and another end of the base board is supported movably up and down by a second support post,
   each of the first support post and the second support post includes a part where a first engagement portion is formed that is engaged with a second engagement portion provided to the base board and supports the base board, and
   the first support post is driven by a first motor and the second support post is driven by a second motor.

* * * * *